(12) United States Patent
Takahashi et al.

(10) Patent No.: US 10,320,020 B2
(45) Date of Patent: Jun. 11, 2019

(54) ELECTRODE CATALYST FOR FUEL CELL, ELECTRODE CATALYST LAYER FOR FUEL CELL, METHOD FOR PRODUCING THE SAME, AND MEMBRANE ELECTRODE ASSEMBLY AND FUEL CELL USING THE CATALYST LAYER

(71) Applicants: NISSAN MOTOR CO., LTD., Yokohama-shi, Kanagawa (JP); NIPPON STEEL CHEMICAL & MATERIAL CO., LTD., Chiyoda-ku, Tokyo (JP)

(72) Inventors: Shinichi Takahashi, Kanagawa (JP); Tetsuya Mashio, Kanagawa (JP); Norifumi Horibe, Kanagawa (JP); Atsushi Ohma, Kanagawa (JP)

(73) Assignees: NISSAN MOTOR CO., LTD., Yokohama-shi (JP); NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 0 days.

(21) Appl. No.: 15/521,676

(22) PCT Filed: Oct. 8, 2015

(86) PCT No.: PCT/JP2015/078611
§ 371 (c)(1),
(2) Date: Apr. 25, 2017

(87) PCT Pub. No.: WO2016/067876
PCT Pub. Date: May 6, 2016

(65) Prior Publication Data
US 2017/0244125 A1    Aug. 24, 2017

(30) Foreign Application Priority Data
Oct. 29, 2014 (JP) ................ 2014-220569

(51) Int. Cl.
*H01M 8/1004* (2016.01)
*B01J 23/42* (2006.01)
(Continued)

(52) U.S. Cl.
CPC .......... *H01M 8/1004* (2013.01); *B01J 23/42* (2013.01); *B01J 35/10* (2013.01); *H01M 4/8605* (2013.01);
(Continued)

(58) Field of Classification Search
None
See application file for complete search history.

(56) References Cited

U.S. PATENT DOCUMENTS

| 9,156,694 B2 | 10/2015 | Morishita |
| 2003/0108481 A1 | 6/2003 | Igarashi et al. |

(Continued)

FOREIGN PATENT DOCUMENTS

| JP | 2003-201417 A | 7/2003 |
| JP | 2004-217507 A | 8/2004 |

(Continued)

OTHER PUBLICATIONS

Isaac Childres, Luis A. Jauregui, Wonjun Park, Helin Cao and Yong P. Chen, "Raman Spectroscopy of Graphene and Related Materials," "New Developments in Photon and Materials Research," ed. J.I. Jang, Nova Science Publishers (Jul. 2013). (Year: 2013).*

(Continued)

*Primary Examiner* — Rena Dye Cronin
(74) *Attorney, Agent, or Firm* — Foley & Lardner LLP

(57) ABSTRACT

The present invention relates to an electrode catalyst for fuel cell containing a catalyst carrier having carbon as a main component and a catalytic metal carried on the catalyst carrier, wherein the electrode catalyst for fuel cell has a ratio R' (D'/G intensity ratio) of a peak intensity of D' band (D'

(Continued)

intensity) measured in the vicinity of 1620 cm$^{-1}$ to a peak intensity of G band (G intensity) measured in the vicinity of 1580 cm$^{-1}$ by Raman spectroscopy of more than 0.6 and 0.8 or less, and satisfies at least one of the (a) to (d). According to the present invention, an electrode catalyst for fuel cell excellent in gas transportability is provided.

7 Claims, 2 Drawing Sheets

(51) Int. Cl.
| | |
|---|---|
| *B01J 35/10* | (2006.01) |
| *H01M 4/92* | (2006.01) |
| *H01M 4/86* | (2006.01) |
| *H01M 8/1041* | (2016.01) |
| *H01M 4/88* | (2006.01) |
| *H01M 8/1018* | (2016.01) |

(52) U.S. Cl.
CPC ....... *H01M 4/8652* (2013.01); *H01M 4/8825* (2013.01); *H01M 4/8828* (2013.01); *H01M 4/92* (2013.01); *H01M 4/926* (2013.01); *H01M 8/1041* (2013.01); *H01M 2008/1095* (2013.01)

(56) References Cited

U.S. PATENT DOCUMENTS

| | | | |
|---|---|---|---|
| 2004/0131768 A1* | 7/2004 | Xie | ............ H01M 4/881 427/115 |
| 2004/0248730 A1* | 12/2004 | Kim | ............ B01J 23/40 502/185 |
| 2006/0093893 A1 | 5/2006 | Matsuo et al. | |
| 2006/0099488 A1* | 5/2006 | Daimon | ............ B01J 21/185 429/483 |
| 2006/0280983 A1* | 12/2006 | Kaneko | ............ H01M 4/8807 429/480 |
| 2007/0224479 A1 | 9/2007 | Takokoro et al. | |
| 2008/0160391 A1 | 7/2008 | Joo et al. | |
| 2009/0047559 A1 | 2/2009 | Terada et al. | |
| 2011/0058308 A1 | 3/2011 | Nishi et al. | |
| 2011/0195339 A1* | 8/2011 | Iijima | ............ H01M 4/8605 429/484 |
| 2014/0199609 A1 | 7/2014 | Iden et al. | |
| 2015/0352522 A1 | 12/2015 | Mizuuchi et al. | |
| 2016/0064744 A1 | 3/2016 | Mashio et al. | |
| 2016/0072133 A1 | 3/2016 | Akizuki et al. | |
| 2016/0072134 A1 | 3/2016 | Ohma et al. | |
| 2016/0079605 A1 | 3/2016 | Mashio et al. | |
| 2016/0079606 A1 | 3/2016 | Mashio et al. | |
| 2016/0087281 A1 | 3/2016 | Mashio et al. | |

FOREIGN PATENT DOCUMENTS

| | | |
|---|---|---|
| JP | 2005-135817 A | 5/2005 |
| JP | 2006-155921 A | 6/2006 |
| JP | 2006-156154 A | 6/2006 |
| JP | 2007-220384 A | 8/2007 |
| JP | 2007-250274 A | 9/2007 |
| JP | 2008-269850 A | 11/2008 |
| JP | 2009-035598 A | 2/2009 |
| JP | 2010-208887 A | 9/2010 |
| WO | WO-2009/075264 A1 | 6/2009 |
| WO | WO-2012/053638 A1 | 4/2012 |
| WO | WO-2014/129597 A1 | 8/2014 |

OTHER PUBLICATIONS

European Extended Search Report, dated Oct. 6, 2017, 11 pages.

Liu et al., "Graphene supported platinum nanoparticles as anode electrocatalyst for direct borohydride fuel cell," International Journal of Hydrogen Energy, 2012, 8 pages.

USPTO Office Action, U.S. Appl. No. 14/786,281, dated Jul. 6, 2018, 15 pages.

USPTO Office Action, U.S. Appl. No. 14/786,281, dated Nov. 2, 2018, 13 pages.

* cited by examiner

[Figure 1]
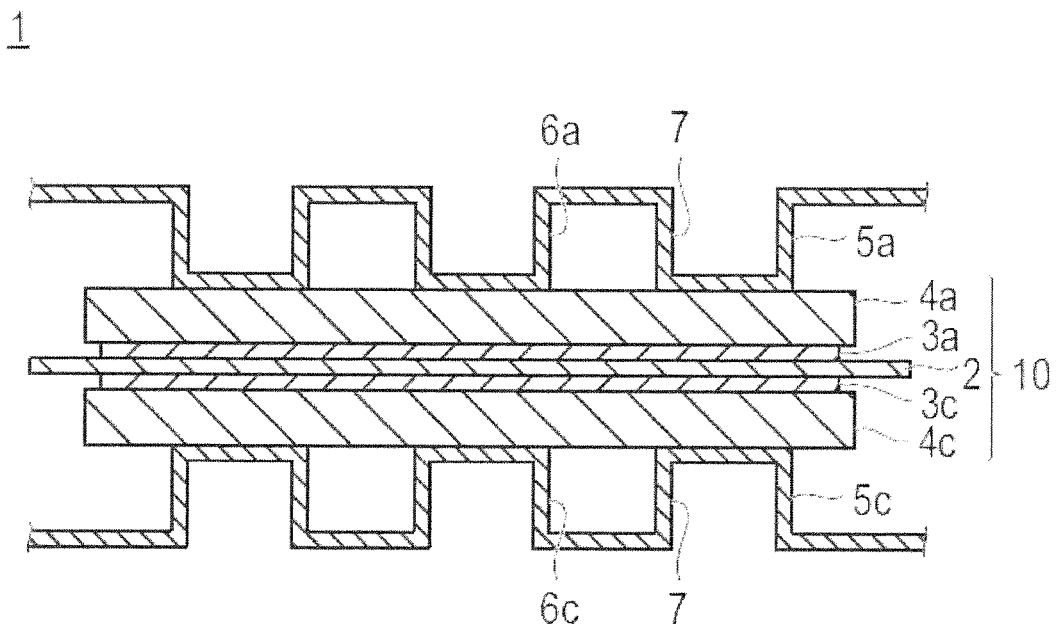

[Figure 2]
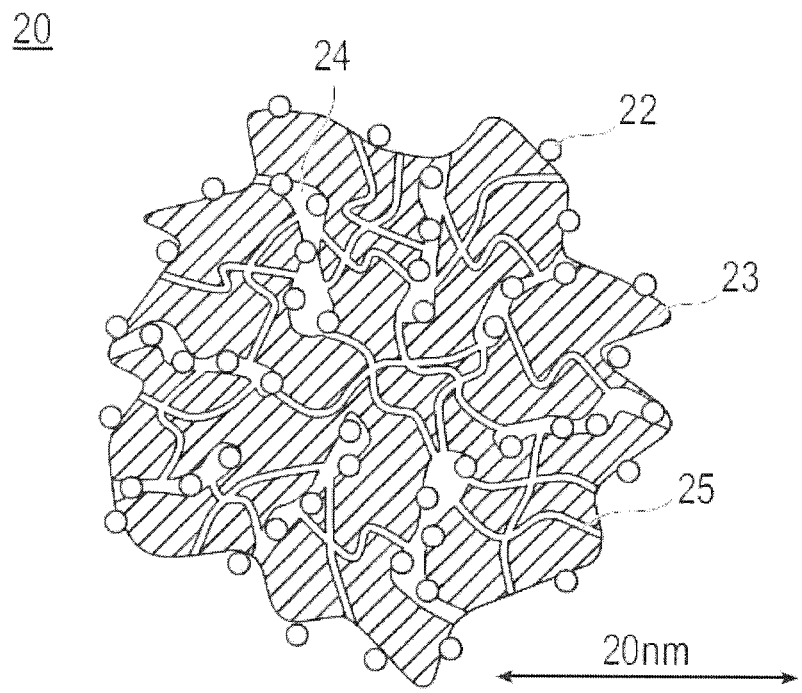
[Figure 3]
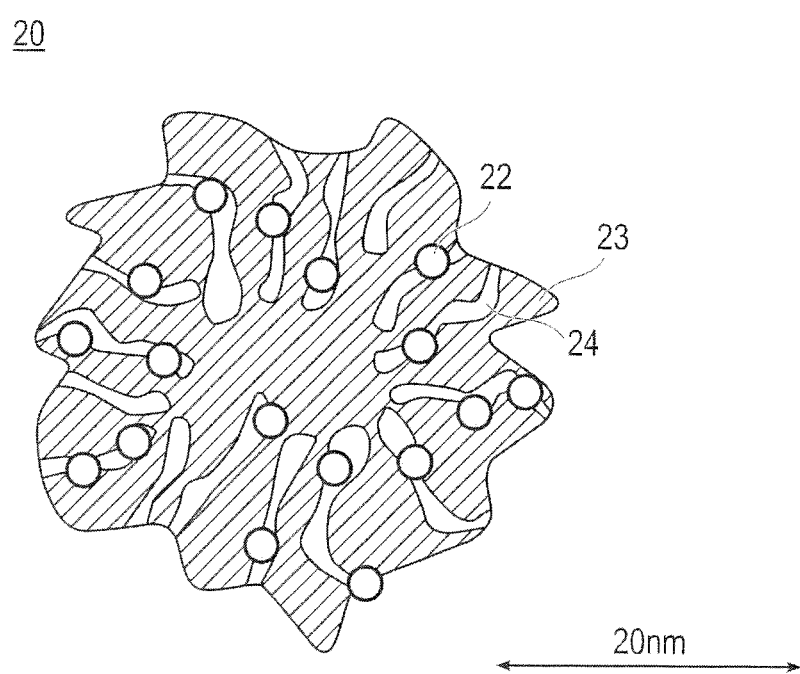

_US 10,320,020 B2_

ELECTRODE CATALYST FOR FUEL CELL, ELECTRODE CATALYST LAYER FOR FUEL CELL, METHOD FOR PRODUCING THE SAME, AND MEMBRANE ELECTRODE ASSEMBLY AND FUEL CELL USING THE CATALYST LAYER

TECHNICAL FIELD

The present invention relates to an electrode catalyst for fuel cell, an electrode catalyst layer for fuel cell, a method for producing the same, a membrane electrode assembly and a fuel cell using the catalyst layer.

BACKGROUND ART

A polymer electrolyte fuel cell using a proton-conductive solid polymer membrane operates at a low temperature, as compared with other types of fuel cells such as a solid oxide fuel cell and a molten carbonate fuel cell. Therefore, the polymer electrolyte fuel cell is expected to be used for a stationary power supply or a power source for a mobile unit such as an automobile, and has started to be practically used.

In the polymer electrolyte fuel cell as described above, an expensive metal catalyst as represented by Pt (platinum) and Pt alloy is generally used, and causes increased cost of the fuel cell. Therefore, the development of the technology that can reduce cost of a fuel cell by reducing the use amount of a noble metal catalyst has been required.

For example, JP 2007-250274 A (corresponding to US 2009/047559 A1) discloses an electrode catalyst having catalytic metal particles carried on a conductive carrier wherein an average particle size of the catalytic metal particles is larger than an average pore size of micropores in the conductive carrier. JP 2007-250274 A (corresponding to US 2009/047559 A1) describes that this configuration can prevent the catalytic metal particles from entering the micropores in the carrier to increase a ratio of catalytic metal particles used in three-phase boundary and to improve the utilization efficiency of an expensive noble metal.

SUMMARY OF INVENTION

However, the electrode catalyst layer using the catalyst disclosed in JP 2007-250274 A (corresponding to US 2009/047559 A1) has had a problem that an electrolyte and catalytic metal particles contact each other, to induce decrease in catalytic activity. In regards to such problem, when a catalytic metal is carried in the fine pores of the carrier into which an electrolyte cannot enter so as to prevent contact between an electrolyte and catalytic metal particles, a transport distance of gas such as oxygen is increased, and gas transportability is lowered. As a result, there has been a problem that a sufficient catalytic activity cannot be elicited, and catalytic performance is deteriorated under high load conditions.

Therefore, the present invention has been made in consideration of the circumstances as described above, and an object of the present invention is to provide an electrode catalyst for fuel cell excellent in gas transportability.

Another object of the present invention is to provide an electrode catalyst for fuel cell excellent in catalytic activity.

Even another object of the present invention is to provide an electrode catalyst layer for fuel cell excellent in gas transportability. Further, even another object of the present invention is to provide an electrode catalyst layer for fuel cell excellent in catalytic activity.

Moreover, even another object of the present invention is to provide a membrane electrode assembly and a fuel cell excellent in power generation performance.

Means for Solving Problems

The present inventors conducted intensive studies to solve the problems mentioned above, and consequently found that the above problems are solved by a catalyst having a specific D'/G intensity ratio and a specific pore distribution, thereby completing the present invention.

BRIEF DESCRIPTION OF DRAWINGS

FIG. 1 is a schematic cross-sectional view showing a basic configuration of the polymer electrolyte fuel cell according to an embodiment of the present invention.

FIG. 2 is a schematic explanatory cross-sectional view showing the shape and structure of the catalysts (a) and (c) according to an embodiment of the present invention.

FIG. 3 is a schematic explanatory cross-sectional view showing the shape and structure of the catalysts (b) and (d) according to an embodiment of the present invention.

DESCRIPTION OF EMBODIMENTS

The electrode catalyst for fuel cell according to this embodiment (herein also referred to as "electrode catalyst" or "catalyst") satisfies the following configurations (I) and (II);

(I) the catalyst has a ratio R' (D'/G intensity ratio) of more than 0.6 and 0.8 or less, which is a ratio of a peak intensity for D' band (D' intensity) measured in the vicinity of 1620 $cm^{-1}$ relative to a peak intensity for G band (G intensity) measured in the vicinity of 1580 $cm^{-1}$ by Raman spectroscopy; and (II) the catalyst satisfies at least one of the following configurations (a) to (d):

(a) the catalyst has pores with a radius of less than 1 nm and pores with a radius of 1 nm or more, a pore volume of the pores with a radius of less than 1 nm of 0.3 cc/g carrier or more, and the catalytic metal carried inside the pores with a radius of 1 nm or more;

(b) the catalyst has pores with a radius of 1 nm or more and less than 5 nm, a pore volume of the pores of 0.8 cc/g carrier or more, and a specific surface area of the catalytic metal of 60 $m^2$/g carrier or less;

(c) the catalyst has pores with a radius of less than 1 nm and pores with a radius of 1 nm or more, a mode radius of pore distribution of the pores with a radius of less than 1 nm of 0.3 nm or more and less than 1 nm, and the catalytic metal carried inside the pores with a radius of 1 nm or more; and (d) the catalyst has a mode radius of pore distribution of pores with a radius of 1 nm or more of 1 nm or more and less than 5 nm, the catalytic metal carried inside the pores with a radius of 1 nm or more, the mode radius being half (½ times of the average particle size) or less of an average particle size of the catalytic metal, and a pore volume of the pores with a radius of 1 nm or more and less than 5 nm of 0.4 cc/g carrier or more.

The electrode catalyst for fuel cell according to this embodiment is a catalyst having a specific peak intensity ratio as measured by Raman spectroscopy and a specific pore distribution. The surface of the electrode catalyst for fuel cell has proper hydrophilicity, and thus the surface of the catalyst is prevented from being completely coated by an electrolyte having hydrophobicity. As a result, gas transportability can be improved.

In addition, the electrode catalyst layer for fuel cell according to this embodiment (herein also referred to as "electrode catalyst layer" or "catalyst layer") contains the catalyst and an electrolyte. Thus, the electrode catalyst layer for fuel cell is also excellent in gas transportability and the catalytic activity is improved.

In addition, the G band measured in the vicinity of 1580 $cm^{-1}$ by Raman spectroscopy is also herein simply referred to as "G band". The D' band measured in the vicinity of 1620 $cm^{-1}$ by Raman spectroscopy is also herein simply referred to as "D' band". Also, the peak intensities of the G band and the D' band are herein referred to as "G intensity" and "D' intensity", respectively. Furthermore, the ratio of the D' intensity to the G intensity is also simply referred to as "R' value" or "D'/G intensity ratio".

The G band and the D' band, and their peak intensities are well known in the art. For example, R. Vidano and D. B Fischbach, J. Am. Ceram. Soc. 61 (1978) 13 to 17 and G. Katagiri, H. Ishida and A. Ishitani, Carbon 26 (1988) 565 to 571 can be referred to.

Furthermore, a pore with a radius of less than 1 nm is also herein referred to as "micropore". In addition, a pore with a radius of 1 nm or more is also herein referred to as "mesopore".

In the electrode catalyst layer described in JP 2007-250274 A (corresponding to US 2009/047559 A1), in order to sufficiently secure three-phase boundary at which a reaction gas, a catalytic metal and an electrolyte (electrolyte polymer) are present at the same time, an electrolyte and catalytic particles are considerably allowed to contact each other on the conductive carrier (for example, paragraph [0058], FIG. 2). However, the inventors of the present invention have found that, a major part of the reaction gas (especially $O_2$) is transported to the catalytic metal via the electrolyte in the above configuration, thus gas transport resistance is high, sufficient reaction gas cannot reach the catalytic metal, and the catalyst cannot exhibit sufficient activity. The inventors of the present invention have intensively studied for the solution of the above problem, and consequently found that three-phase boundary (reaction site) are formed with a reaction gas, a catalytic metal and water, whereby the catalyst can be effectively used. Moreover, the inventors of the present invention have found that gas transportability is improved by the catalyst satisfying the above (I) and (II), thereby completing the present invention.

The catalyst using a catalyst carrier containing carbon as a main component has many edges exhibiting hydrophilicity on the surface thereof by satisfying the above (I), namely, by setting the R' value within the above range (more than 0.6 and 0.8 or less). On the other hand, the electrolyte constituting the electrode catalyst layer together with the catalyst, especially a polymer electrolyte having a hydrophobic structure in a main chain such as a fluorine-based polymer electrolyte, has hydrophobicity. Therefore, the surface of the catalyst having the above configuration has many parts where the electrolyte is hard to adsorb, thus is suppressed to be completely covered with the electrolyte. Namely, the catalyst according to this embodiment is partially covered with the electrolyte. As a result, lowering of gas transportability by the electrolyte is suppressed. Hereinbelow, the mechanism related to the R' value will be described in detail. The following mechanism of exhibiting the action effect is an estimate, and the present invention is not limited by the following estimate.

The G band is a peak derived from graphite (internal vibration in the hexagonal lattice of a carbon atom), and is observed in the vicinity of 1580 $cm^{-1}$ by Raman scattering analysis. Also, the D' band is observed in the vicinity of 1620 $cm^{-1}$ by Raman scattering analysis as a shoulder of the G band. This D' band is derived from disorder or defect of the graphite structure and appears when the crystal size of graphite is small, or many edges of the graphene sheet would appear.

The edges of the graphene sheet have an unstable structure that is not a 6-membered ring structure, thus acts as a reaction active point. Therefore, various functional groups are likely to adsorb to the edges (a functional group is likely to be formed in the edges). Moreover, a water molecule forms a hydrogen bond, thereby adsorbing to the functional group. Then, other water molecule can additionally adsorb to this water molecule. As a result, it is assumed that, when many edges are present, the amount of the functional group can be increased, whereby hydrophilicity would be exhibited.

Therefore, it is considered that the smaller the D'/G intensity ratio, i.e., the R' value, the lower the hydrophilicity in the catalyst carrier and thus the surface of the catalyst, and the larger the R' value, the higher the hydrophilicity on the surface of the catalyst.

The catalyst according to this embodiment has an appropriate amount of highly hydrophilic edge part, in order to satisfy the above (I). Therefore, the surface of the catalyst has proper hydrophilicity, thus when the electrode catalyst layer is formed, the electrolyte having hydrophobicity repels to the surface of the catalyst and is hard to adsorb. Namely, the electrolyte can be partially adsorbed to the surface of the catalyst. On the other hand, when the R' value is 0.6 or less, a highly hydrophilic edge part would be less, and the electrolyte would completely cover the surface of the catalyst (or the adsorption amount of the electrolyte would become too much). As a result, the electrolyte would cover the catalytic metal, and gas transportability would be lowered. Therefore, when the R' value is more than 0.6, the electrolyte can partially cover the surface of the catalyst, thus lowering of gas transportability by the electrolyte can be suppressed.

On the other hand, when the R' value is too large (more than 0.8), the hydrophilicity on the surface of the catalyst would be too high, the adsorption amount of water is increased. Accordingly, transport resistance of reaction gas is increased, and gas transportability is lowered.

The catalyst contained in the electrode catalyst layer according to this embodiment satisfies the above (II), in addition to having the specific R' value. Namely, the catalyst in this embodiment has a specific pore distribution, whereby the catalytic metal is stored (carried) in the pore, as described in detail below. Here, the inventors of the present invention have found that, when the entrance (opening) of the pore is covered with the electrolyte, the reaction gas (especially, oxygen) is hard to be transported to the catalytic metal stored (carried) inside the pore. More specifically, when the electrolyte is added in a state where the catalytic metal is stored (carried) in the pore of the carrier, the surface of the catalyst is completely covered with the electrolyte, and the electrolyte sometimes blocks the entrance (opening) of the pore in some cases. Moreover, in this case, in order that the reaction gas reaches the catalytic metal inside the pore, it would be necessary that the reaction gas passes through the electrolyte, and consequently, gas transportability would be likely to be lowered.

On the other hand, the electrode catalyst layer using the catalyst satisfying the above (I) has a configuration in which the electrolyte partially covers the surface of the catalyst. As a result, in the electrode catalyst layer according to this embodiment, the amount of the electrolyte adsorbed to the catalyst is not too much, and blocking of the entrance (opening) of the pore in which the catalytic metal is stored (carried) by the electrolyte can be suppressed. Therefore, reaction gas is more rapidly and more efficiently transported also to the catalytic metal carried in the pore, and gas transportability is improved. As a result, the catalyst can exhibit high catalytic activity, namely, the catalytic reaction can be promoted. Also, the above effect can be effectively exhibited under high load conditions. Therefore, a membrane electrode assembly and a fuel cell having the electrode catalyst layer according to this embodiment show high current-voltage (iV) characteristics (suppress voltage drop at high current density), and has excellent power generation performance.

Hereinbelow, an embodiment of the electrode catalyst of the present invention, an embodiment of the electrode catalyst layer of the present invention, and an embodiment of the membrane electrode assembly ("MEA") and the fuel cell using the same will be described in detail while properly referring to the drawings. However, the present invention is not limited only to the following embodiments. Each drawing is exaggeratedly expressed for convenience of explanation, and dimensional ratios of each constituent in each drawing may be different from an actual ratio. Also, when the embodiment of the present invention is described while referring to the drawings, the same element is denoted by the same reference in the description of the drawings, and the duplicated description is omitted.

In the Description, "X to Y" showing a range means "X or more and Y or less". Also, unless otherwise noted, operations and measurement of physical properties and the like are performed under the conditions of room temperature (20 to 25° C.)/relative humidity of 40 to 50%.

[Fuel Cell]

A fuel cell comprises a membrane electrode assembly ("MEA") and a pair of separators comprising an anode side separator having a fuel gas passage for the fuel gas to pass through and a cathode side separator having an oxidant gas passage for the oxidant gas to pass through. The fuel cell of this embodiment can exhibit high power generation performance.

FIG. 1 is a schematic view showing a basic configuration of a polymer electrolyte fuel cell ("PEFC") 1 according to an embodiment of the present invention. The PEFC 1 has a solid polyelectrolyte membrane 2, and a pair of catalyst layers (an anode catalyst layer 3a and a cathode catalyst layer 3c) that sandwich it. Moreover, the laminated body of the solid polyelectrolyte membrane 2 and the catalyst layers (3a and 3c) is further sandwiched by a pair of gas diffusion layers ("GDL") (an anode gas diffusion layer 4a and a cathode gas diffusion layer 4c). As described above, the solid polyelectrolyte membrane 2, a pair of the catalyst layers (3a and 3c) and a pair of the gas diffusion layers (4a and 4c) constitute a membrane electrode assembly ("MEA") 10 in a laminated state.

In the PEFC 1, the MEA 10 is further sandwiched by a pair of separators (an anode separator 5a and a cathode separator 5c). In FIG. 1, the separators (5a and 5c) are shown as being located on both ends of the illustrated MEA 10. However, in a fuel cell stack in which a plurality of MEAs is stacked up, the separators are also generally used as the separators for the adjacent PEFC (not shown). In other words, the MEAs form a stack by sequentially laminated via the separators in a fuel cell stack. Moreover, in an actual fuel cell stack, gas sealing parts are provided between the separators (5a and 5c) and the solid polyelectrolyte membrane 2 as well as between the PEFC 1 and other PEFCs that are located adjacent to it, but such arrangements are omitted in FIG. 1.

The separators (5a and 5c) are obtained by, for example, applying a press process to thin plates with a thickness of 0.5 mm or less, forming a corrugating shape as shown in FIG. 1. The convex areas of the separators (5a and 5c) as seen from the MEA side are in contact with the MEA 10. This provides a secure electrical connection with the MEA 10. Also, the concave areas of the separators (5a and 5c) as seen from the MEA side (the space between the separators and the MEA generated due to a corrugating shape of the separators) serve as a gas passages for the gas to pass through during the operation of the PEFC 1. Specifically, the fuel gas (e.g., hydrogen) is allowed to pass through the gas passage 6a of the anode separator 5a, and the oxidant gas (e.g., air) is allowed to pass through the gas passage 6c of the cathode separator 5c.

On the other hand, the concave areas of the separators (5a and 5c) as seen from the opposite side of the MEA side serve as a refrigerant passage 7 for allowing the refrigerant (e.g., water) for cooling the PEFC to pass through during the operation of the PEFC 1. Moreover, a manifold (not shown in figures) is normally provided in the separator. The manifold functions as a connecting means for connecting each cell when the stack is configured. According to the configuration, a mechanical strength of the fuel cell stack can be secured.

In the embodiment shown in FIG. 1, each of the separators (5a and 5c) is formed in a corrugating shape. However, the separator is not limited to such a corrugating shape. If it can serve as a gas passage and a coolant passage, arbitrary shape such as a flat shape and a partially corrugating shape may be employed.

The fuel cell having MEA according to this embodiment as described above has excellent performance of power generation. The kind of the fuel cell is not particularly limited. Although the polymer electrolyte type fuel cell is used as an example of the type of the fuel cell in the foregoing description, the type of the fuel cell includes alkaline fuel cell, direct methanol fuel cell, and micro fuel cell, besides this. Among them, the polymer electrolyte type fuel cell (PEFC) is most favorable as it can be built compact, and provide high density and high power output. Furthermore, the fuel cell is suitable not only as a power supply for a mobile unit such as a motor vehicle where the installation space is limit, but also as a stationary power supply. Among them, it is particularly suitable for use as a power supply for a mobile unit such as an automobile where high output voltage is required after stopping operation for a relatively long time.

The fuel to be used for operating the fuel cell is not particularly limited. For example, hydrogen, methanol, ethanol, 1-propanol, 2-propanol, 1-butanol, secondary butanol, tertiary butanol, dimethyl ether, diethyl ether, ethylene glycol, diethylene glycol and the like can be used. Of these, hydrogen and methanol are preferably used as they can provide high output power.

Moreover, the application use of a fuel cell is not particularly limited, but the application to a motor vehicle is preferable. The electrolyte membrane-electrode assembly of the present invention is excellent in power generation performance and durability, and miniaturization can be realized.

Therefore, the fuel cell of the present invention is particularly effective when the fuel cell is applied to a motor vehicle, from the viewpoint of vehicle mountability.

Although the members that constitute the fuel cell of this configuration will be briefly described below, the technical scope of the present invention should not be construed to be confined to limited by the configuration described below.

[Electrode Catalyst Layer (Catalyst Layer)]

The electrode catalyst layer (catalyst layer) according to this embodiment may be either a cathode catalyst layer or an anode catalyst layer, but is preferably a cathode catalyst layer. This is because, as described above, in the catalyst layer of the present invention, a catalyst can be effectively used by forming three-phase boundary with water unless the catalyst and the electrolyte contact each other, water is formed in the cathode catalyst layer.

The electrode catalyst layer (catalyst layer) according to this embodiment contains a catalyst containing a catalyst carrier and a catalytic metal carried on the catalyst carrier (catalyst), and an electrolyte.

(Catalyst)

The catalyst (electrode catalyst) according to this embodiment contains a catalyst carrier containing carbon as a main component (carbon powder; herein also simply referred to as "carrier") and a catalytic metal carried on the carrier. The catalyst according to this embodiment satisfies the following (I) and (II):

(I) having a ratio R' of D' intensity to G intensity (D'/G intensity ratio) of more than 0.6 and 0.8 or less; and (II) satisfying at least one of the following (a) to (d):

(a) the catalyst has pores with a radius of less than 1 nm and pores with a radius of 1 nm or more, a pore volume of the pores with a radius of less than 1 nm of 0.3 cc/g carrier or more, and the catalytic metal carried inside the pores with a radius of 1 nm or more;

(b) the catalyst has pores with a radius of 1 nm or more and less than 5 nm, a pore volume of the pores of 0.8 cc/g carrier or more, and a specific surface area of the catalytic metal of 60 $m^2$/g carrier or less;

(c) the catalyst has pores with a radius of less than 1 nm and pores with a radius of 1 nm or more, a mode radius of pore distribution of the pores with a radius of less than 1 nm of 0.3 nm or more and less than 1 nm, and the catalytic metal carried inside the pores with a radius of 1 nm or more; and (d) the catalyst has a mode radius of pore distribution of pores with a radius of 1 nm or more of 1 nm or more and less than 5 nm, the catalytic metal carried inside the pores with a mode radius of 1 nm or more and less than 5 nm, the mode radius being half or less of an average particle size of the catalytic metal, and a pore volume of the pores with a radius of 1 nm or more and less than 5 nm of 0.4 cc/g carrier or more.

Based on the above (I), the edge amount of the surface of the catalyst, more specifically, carbon (graphene) as a carrier is increased, and the surface of the catalyst can have proper hydrophilicity. As a result, the electrolyte having hydrophobicity does not completely cover the surface of the catalyst, and increase in gas transport resistance by electrolyte can be suppressed.

The catalyst having an R' value more than 0.6 has high edge amount of the surface of the catalyst (the surface of the carrier), and hydrophilicity is improved, thus adsorption of the electrolyte is suppressed, and gas transportability is improved. However, in an R' value of 0.6 or less, the edge amount is low, hydrophilicity on the surface of the catalyst decreases (hydrophilicity increases), and the electrolyte is likely to adsorb to the surface of the catalyst. As a result, the electrolyte having hydrophobicity does not partially cover the surface of the catalyst, but covers almost entire surface of the catalyst, and gas transport resistance by the electrolyte is increased. Therefore, gas such as oxygen is hard to reach the catalyst carried in the pore of the carrier, and gas transportability is lowered.

On the other hand, in an R' value more than 0.8, the edge amount of the surface of the catalyst (the surface of the carrier) becomes too high, hydrophilicity on the surface of the catalyst becomes too high. Then, water adsorbs to the surface of the catalyst, and transportability of the reaction gas is lowered.

Therefore, from the viewpoint of further improving gas transportability, and sufficiently exhibiting functions as a catalyst, the R' value is preferably more than 0.61 and 0.8 or less, more preferably more than 0.66 and 0.75 or less, and is further preferably 0.67 or more and less than 0.74.

In addition, the edge of the surface of the catalyst (the surface of the carrier) can be a start point of electrochemical corrosion in the graphite (graphene) structure. Accordingly, also from the viewpoint of durability, the R' value is preferably 0.8 or less, more preferably in a range not more than 0.8, and further preferably 0.75 or less, and further more preferably less than 0.74.

In this description, the R' value can be determined by obtaining a Raman spectrum of a carbon material with a Micro-Raman spectroscope, and calculating a relative intensity ratio between peak intensity in the vicinity of 1620 $cm^{-1}$ called a D' band (D' intensity) and peak intensity in the vicinity of 1580 $cm^{-1}$ called a G band (G intensity), that is, a peak area ratio (D' intensity/G intensity). As the peak area, a peak area determined by the Raman spectrometry shown below is adopted.

(Raman Spectroscopic Measurement Method)

A Raman spectrum is obtained using a micro laser Raman SENTERRA (manufactured by Bruker Optics K.K.) as a measurement apparatus, at room temperature (25° C.) for an exposure time of 30 seconds by four times as a cumulated number under the following conditions. Peaks of G band and D' band can be determined by peak fitting with Gaussian distribution.

<Measurement Conditions>

Excitation wavelength: Nd: SHG of YAG, 532 nm

Laser output: 3 mW

Spot size: 1 μm or less

Detector: CCD

The catalyst layer according to this embodiment is excellent in gas transportability, by satisfying the above (II), in addition to the above (I). It is sufficient that the catalyst contained in the electrode catalyst layer according to this embodiment satisfies at least one of the above (a) to (d). The catalyst satisfying the above (a), the catalyst satisfying the above (b), the catalyst satisfying the above (c) and the catalyst satisfying the above (d) are herein also referred to as "catalyst (a)", "catalyst (b)", "catalyst (c)" and "catalyst (d)", respectively. The configurations of the catalysts (a) to (d) will be described in detail hereinbelow.

(Catalysts (a) and (c))

The catalyst (a) contains a catalyst carrier and a catalytic metal carried on the catalyst carrier and satisfies the following configurations (a-1) to (a-3):

(a-1) the catalyst has pores with a radius of less than 1 nm (primary pores) and pores with a radius of 1 nm or more (primary pores);

(a-2) a pore volume of the pores with a radius of less than 1 nm is 0.3 cc/g carrier or more; and (a-3) the catalytic metal is carried inside the pores with a radius of 1 nm or more.

In addition, the catalyst (c) contains a catalyst carrier and a catalytic metal carried on the catalyst carrier and satisfies the following configurations (a-1), (c-1) and (a-3):

(a-1) the catalyst has pores with a radius of less than 1 nm and pores with a radius of 1 nm or more;

(c-1) a mode radius of pore distribution of the pores with a radius of less than 1 nm is 0.3 nm or more and less than 1 nm; and (a-3) the catalytic metal is carried inside the pores with a radius of 1 nm or more.

As described above, the inventors of the present invention have found that, even when a catalytic metal does not contact an electrolyte, the catalytic metal can be effectively used by forming three-phase boundary with water. Therefore, the catalysts (a) and (c) adopt a configuration that the (a-3) the catalytic metal is carried inside the mesopores in which the electrolyte cannot enter, whereby the catalytic activity can be improved. Meanwhile, when the catalytic metal is carried inside the mesopores in which the electrolyte cannot enter, the transport distance of gas such as oxygen would be increased, and gas transportability would be lowered, thus a sufficient catalytic activity cannot be elicited, and catalytic performance would be deteriorated under high load conditions. On the other hand, the (a-2) the pore volume of micropores in which the electrolyte and the catalytic metal can hardly enter or cannot enter at all is sufficiently secured, or the (c-1) the mode radius of the micropores is set large, whereby the transport path of gas can be sufficiently secured. Therefore, gas such as oxygen can be efficiently transported to the catalytic metal in the mesopores, namely, gas transport resistance can be reduced. Furthermore, as described above, the catalyst has a proper R' value, thus the surface of the catalyst is partially covered with the electrolyte, and the entrance (opening) of mesopores and micropores are hard to be covered.

According to the above configuration, gas (for example, oxygen) passes through micropores (gas transportability is improved), gas can be efficiently contacted with the catalytic metal. Therefore, when the catalysts (a) and (c) are used in the catalyst layer, micropores would be present in large volume, thus a reaction gas can be transported to the surface of the catalytic metal present in the mesopores via the micropores (path), and gas transport resistance can be further reduced. Therefore, the catalyst layer containing the catalysts (a) and (c) can exhibit higher catalytic activity, namely, the catalytic reaction can be further promoted. Therefore, the membrane electrode assembly and the fuel cell having the catalyst layer containing the catalysts (a) and (c) are excellent in power generation performance.

FIG. 2 is a schematic explanatory cross-sectional view showing the shape and structure of the catalysts (a) and (c). As shown in FIG. 2, the catalysts (a) and (c) shown by reference 20 contains a catalytic metal 22 and a catalyst carrier 23. Also, a catalyst 20 has pores with a radius of less than 1 nm (micropores) 25 and pores with a radius of 1 nm or more (mesopores) 24. The catalytic metal 22 is stored (carried) inside the mesopores 24. Also, it is sufficient that at least a part of the catalytic metal 22 is stored (carried) inside the mesopores 24, and a part may be carried on the surface of the catalyst carrier 23. However, it is preferable that substantially all of the catalytic metal 22 is carried inside the mesopores 24, from the viewpoint of preventing the contact between the electrolyte and the catalytic metal in the catalyst layer. The phrase "substantially all of the catalytic metal" is not particularly limited so long as it is the amount that can sufficiently improve the catalytic activity. The phrase "substantially all of the catalytic metal" is present in an amount of preferably 50% by weight or more (upper limit: 100% by weight) and more preferably 80% by weight or more (upper limit: 100% by weight), in the whole catalytic metal.

The phrase "the catalytic metal is carried inside the mesopores" herein can be confirmed by reduction in the volume of mesopores before and after carrying the catalytic metal on the catalyst carrier. Specifically, the catalyst carrier has micropores and mesopores, and each pore has a certain volume, but when the catalytic metal is stored (carried) in these pores, the volume of each pore is reduced. Therefore, when the difference between the volume of mesopores of the catalyst (carrier) before carrying the catalytic metal and the volume of mesopores of the catalyst (carrier) after carrying the catalytic metal [=(volume before carrying)–(volume after carrying)] exceeds 0, it means that "the catalytic metal is carried inside the mesopores". Similarly, when the difference between the volume of micropores of the catalyst (carrier) before carrying the catalytic metal and the volume of micropores of the catalyst (carrier) after carrying the catalytic metal [=(volume before carrying)–(volume after carrying)] exceeds 0, it means that "the catalytic metal is carried inside the micropores". Preferably, the catalytic metal is carried in the mesopores more than in the micropores (i.e., reduction value of the volume of mesopores between before and after carrying>reduction value of the volume of micropores between before and after carrying). It is because gas transport resistance is reduced thereby, and a path for gas transportation can be sufficiently secured. The reduction value of the pore volume of mesopores between before and after carrying the catalytic metal is preferably 0.02 cc/g or more, and more preferably 0.02 to 0.4 cc/g, in consideration of the reduction in gas transport resistance, securing of the path for gas transportation, and the like.

In addition, the pore volume of pores with a radius of less than 1 nm (micropores) (of the catalyst after carrying the catalytic metal) is 0.3 cc/g carrier or more, and/or the mode radius (modal radius) of pore distribution of micropores (of the catalyst after carrying the catalytic metal) is 0.3 nm or more and less than 1 nm. Preferably, the pore volume of micropores is 0.3 cc/g carrier or more, and the mode radius of pore distribution of micropore is 0.3 nm or more and less than 1 nm. When the pore volume and/or mode radius of micropores is within the above range, micropores sufficient for gas transportation can be secured, and gas transport resistance is small. Therefore, a sufficient amount of gas can be transported to the surface of the catalytic metal present in the mesopores via the micropores (path), thus the catalyst of the present invention can exhibit high catalytic activity, namely, the catalytic reaction can be promoted. Also, electrolyte (ionomer) and liquid (for example, water) cannot enter the micropores, only gas is selectively passed (gas transport resistance can be reduced). The pore volume of micropores is more preferably 0.3 to 2 cc/g carrier, and particularly preferably 0.4 to 1.5 cc/g carrier, in consideration of the effect of improving gas transportability. In addition, the mode radius of pore distribution of micropores is more preferably 0.4 to 1 nm, and particularly preferably 0.4 to 0.8 nm. The pore volume of pores with a radius of less than 1 nm is herein also simply referred to as "the pore volume of micropores". Similarly, the mode radius of pore distribution of micropores is herein also simply referred to as "the mode radius of micropores".

The pore volume of the pores with a radius of 1 nm or more and less than 5 nm (mesopores) (of the catalyst after carrying the catalytic metal) is not particularly limited, but is preferably 0.4 cc/g carrier or more, more preferably 0.4 to 3 cc/g carrier, and particularly preferably 0.4 to 1.5 cc/g carrier. When the pore volume is within the above range, more catalytic metal can be stored (carried) in the mesopores, the electrolyte and the catalytic metal in the catalyst layer can be physically separated from each other (contact between the electrolyte and the catalytic metal can be more effectively suppressed and prevented). Therefore, the activity of the catalytic metal can be more effectively used. Also, by the presence of many mesopores, the action and effect according to the present invention are more remarkably exhibited, and the catalytic reaction can be more effectively promoted. In addition, the micropores function as a transport path of gas, and three-phase boundary with water is more remarkably formed, thus the catalytic activity can be further improved. The pore volume of pores with a radius of 1 nm or more is herein also simply referred to as "the pore volume of mesopores".

A mode radius (modal radius) of pore distribution of pores with a radius of 1 nm or more (mesopores) (of the catalyst after carrying the catalytic metal) is not particularly limited, but it is preferably 1 to 5 nm, more preferably 1 to 4 nm, and particularly preferably 1 to 3 nm. In the case of the mode radius of pore distribution of mesopores described above, a more sufficient amount of the catalytic metal can be stored (carried) in the mesopores, and the electrolyte and the catalytic metal in the catalyst layer can be physically separated from each other (contact between the electrolyte and the catalytic metal can be more effectively suppressed and prevented). Therefore, the activity of the catalytic metal can be more effectively used. Also, by the presence of large-volume mesopores, the action and effect according to the present invention are more remarkably exhibited, and the catalytic reaction can be more effectively promoted. In addition, the micropores act as a transport path of gas, and three-phase boundary are more remarkably formed by water, thus the catalytic activity can be further improved. The mode radius of pore distribution of mesopores is herein also simply referred to as "the mode radius of mesopores".

The BET specific surface area [BET specific surface area of the catalyst per 1 g of the carrier (m²/g carrier)] (of the catalyst after carrying the catalytic metal) is not particularly limited, but is preferably 900 m²/g carrier or more, 1000 m²/g carrier or more, more preferably 1000 to 3000 m²/g carrier, and particularly preferably 1100 to 1800 m²/g carrier. In the case of the specific surface area as described above, sufficient mesopores and micropores can be secured, thus while securing micropores (lower gas transport resistance) sufficient for gas transportation, more catalytic metal can be stored (carried) in the mesopores. Also, the electrolyte and the catalytic metal in the catalyst layer can be physically separated from each other (contact between the electrolyte and the catalytic metal can be more effectively suppressed and prevented). Therefore, the activity of the catalytic metal can be more effectively used. In addition, by the presence of many micropores and mesopores, the action and effect according to the present invention are more remarkably exhibited, and the catalytic reaction can be more effectively promoted. Moreover, the micropores act as a transport path of gas, and three-phase boundary are more remarkably formed by water, thus catalytic activity can be further improved.

The "BET specific surface area (m²/g carrier)" of the catalyst is herein measured by the nitrogen adsorption method. In detail, about 0.04 to 0.07 g of catalyst powder is accurately weighed, and sealed in a sample tube. The sample tube is preliminarily dried in a vacuum drier at 90° C. for several hours to obtain a measurement sample. An electronic balance (AW220) manufactured by Shimadzu Corporation is used for weighing. Meanwhile, as to the coated sheet, about 0.03 to 0.04 g of the net weight of a coating layer in which the weight of Teflon (substrate) of the same area is deducted from the total weight of the coated sheet is used as a sample weight. Next, the BET specific surface area is measured under the following measurement conditions. A BET plot is obtained from a relative pressure (P/P0) in the range of about 0.00 to 0.45, in the adsorption side of the adsorption and desorption isotherms, thereby calculating the BET specific surface area from the slope and intercept thereof.

<Measurement Conditions>

Measurement Apparatus: BELSORP 36, High-Precise Automatic Gas Adsorption Apparatus produced by BEL Japan, Inc.

Adsorption Gas: $N_2$

Dead Volume Measurement Gas: He

Adsorption Temperature: 77 K (Liquid Nitrogen Temperature)

Measurement Preparation: Vacuum Dried at 90° C. for several hours (After He Purging, Set on Measurement Stage)

Measurement Mode: Adsorption Process and Desorption Process in Isotherm

Measurement Relative Pressure $P/P_0$: about 0 to 0.99

Equilibrium Setting Time: 180 sec for 1 relative pressure

The "radius of pores of micropores (nm)" herein refers to a radius of pores measured by the nitrogen adsorption method (MP method). Also, the "mode radius of pore distribution of micropores (nm)" herein refers to a pore radius at a point taking a peak value (maximum frequency) in the differential pore distribution curve obtained by the nitrogen adsorption method (MP method). The lower limit of the pore radius of micropores is a lower limit that can be measured by the nitrogen adsorption method, i.e., 0.42 nm or more.

Similarly, the "radius of pores of mesopores (nm)" refers to a radius of pores measured by the nitrogen adsorption method (DH method). Also, the "mode radius of pore distribution of mesopores (nm)" herein refers to a pore radius at a point taking a peak value (maximum frequency) in the differential pore distribution curve obtained by the nitrogen adsorption method (DH method). The upper limit of the pore radius of mesopores is not particularly limited, but is 5 nm or less.

The "pore volume of micropores" herein refers to a total volume of micropores with a radius of less than 1 nm present in the catalyst, and expressed as a volume per 1 g of the carrier (cc/g carrier). The "pore volume of micropores (cc/g carrier)" is calculated as an area under the differential pore distribution curve obtained by the nitrogen adsorption method (MP method) (integrated value). Similarly, the "pore volume of mesopores" refers to a total volume of mesopores with a radius of 1 nm or more and less than 5 nm present in the catalyst, and expressed as a volume per 1 g of the carrier (cc/g carrier). The "pore volume of mesopores (cc/g carrier)" is calculated as an area under the differential pore distribution curve obtained by the nitrogen adsorption method (DH method) (integrated value).

The "differential pore distribution" herein refers to a distribution curve obtained by plotting a pore diameter on the horizontal axis and a pore volume corresponding to the pore diameter in the catalyst on the vertical axis. That is to say, a value (dV/d (log D)) such that differential pore volume dV is divided by logarithmic difference of the pore diameter d (log D) is calculated, wherein the pore volume of the catalyst obtained by the nitrogen adsorption method (MP method for the case of micropores; DH method for the case of mesopores) is defined as V and the pore diameter is defined as D. Moreover, the differential pore distribution curve is obtained by plotting this dV/d (log D) on the average pore diameter of each section. The differential pore volume dV signifies the increment of the pore volume between measuring points.

The method for measuring the radius of micropores and pore volume by the nitrogen adsorption method (MP method) is not particularly limited, and for example, the method described in known documents such as "Science of Adsorption" (second edition, written jointly by Seiichi Kondo, Tatsuo Ishikawa and Ikuo Abe, MARUZEN Co., Ltd.), "Fuel Cell Characterization Methods" (edited by Yoshio Takasu, Masaru Yoshitake, Tatsumi Ishihara, Kagaku-Dojin Publishing Co., Inc.), and R. Sh. Mikhail, S. Brunauer, E. E. Bodor J. Colloid Interface Sci., 26, 45 (1968) can be employed. The radius of micropores and pore volume by the nitrogen adsorption method (MP method) are a value herein measured by the method described in R. Sh. Mikhail, S. Brunauer, E. E. Bodor J. Colloid Interface Sci., 26, 45 (1968).

The method for measuring the radius of mesopores and pore volume by the nitrogen adsorption method (DH method) is not also particularly limited, and for example, the method described in known documents such as "Science of Adsorption" (second edition, written jointly by Seiichi Kondo, Tatsuo Ishikawa and Ikuo Abe, MARUZEN Co., Ltd.), "Fuel Cell Characterization Methods" (edited by Yoshio Takasu, Masaru Yoshitake, Tatsumi Ishihara, Kagaku-Dojin Publishing Co., Inc.), and D. Dollion, G. R. Heal: J. Appl. Chem., 14, 109 (1964) can be employed. The radius of mesopores and pore volume by the nitrogen adsorption method (DH method) are a value herein measured by the method described in D. Dollion, G. R. Heal: J. Appl. Chem., 14, 109 (1964).

(Catalyst (b))

The catalyst (b) contains a catalyst carrier and a catalytic metal carried on the catalyst carrier and satisfies the following configurations (b-1) to (b-3):

(b-1) the catalyst has pores with a radius of 1 nm or more and less than 5 nm;

(b-2) a pore volume of the pores with a radius of 1 nm or more and less than 5 nm is 0.8 cc/g carrier or more; and (b-3) a specific surface area is the catalytic metal of 60 $m^2/g$ carrier or less.

According to the catalyst having the configurations of the (b-1) to (b-3) described above, it is suppressed that in the pores of the catalyst is filled with water, and then pores contributing to transportation of a reaction gas is sufficiently secured. As a result, a catalyst excellent in gas transportability can be provided. In detail, the volume of mesopores effective to gas transportation is sufficiently secured, and further, the specific surface area of the catalytic metal is reduced, whereby the amount of the water retained in the mesopores in which the catalytic metal is carried can be sufficiently reduced. Therefore, it is suppressed that in the mesopores is filled with water, thus gas such as oxygen can be more efficiently transported to the catalytic metal in the mesopores. Furthermore, as described above, the catalyst has a proper R' value, thus the surface of the catalyst is partially covered with the electrolyte, and the entrance (opening) of the mesopores is hard to be covered.

According to the above configuration, gas transport resistance in the catalyst layer can be further reduced. As a result, the catalytic reaction is promoted, and the catalyst (b) of this embodiment can exhibit higher catalytic activity. Therefore, a membrane electrode assembly and a fuel cell having a catalyst layer using the catalyst (b) of this embodiment are excellent in power generation performance.

FIG. 3 is a schematic explanatory cross-sectional view showing the shape and structure of the catalysts (b) and (d). As shown in FIG. 3, the catalysts (b) and (d) shown by reference 20' contains a catalytic metal 22' and a catalyst carrier 23'. The catalyst 20' has pores with a radius of 1 nm or more and less than 5 nm (mesopores) 24'. The catalytic metal 22' is mainly carried inside the mesopores 24'. Also, it is sufficient that at least a part of the catalytic metal 22' is carried inside the mesopores 24', and a part may be carried on the surface of the catalyst carrier 23'. However, it is preferable that substantially all the catalytic metal 22' is carried inside the mesopores 24', from the viewpoint of preventing the contact between the electrolyte (electrolyte polymer, ionomer) and the catalytic metal in the catalyst layer. When the catalytic metal contacts the electrolyte, the area specific activity of the surface of the catalytic metal is reduced. On the other hand, according to the above configuration, it is possible to make the electrolyte not to enter the mesopores 24' of the catalyst carrier 23', and the catalytic metal 22' and the electrolyte can be physically separated from each other. Moreover, three-phase boundary can be formed with water, and consequently the catalytic activity is improved. The phrase "substantially all the catalytic metal" is not particularly limited so long as it is the amount that can sufficiently improve the catalytic activity. The phrase "substantially all the catalytic metal" is present in an amount of preferably 50% by weight or more (upper limit: 100% by weight) and more preferably 80% by weight or more (upper limit: 100% by weight), in the whole catalytic metal.

The pore volume of pores with a radius of 1 nm or more and less than 5 nm (mesopores) (of the catalyst after carrying the catalytic metal) is 0.8 cc/g carrier or more. The pore volume of mesopores is preferably 0.8 to 3 cc/g carrier, and particularly preferably 0.8 to 2 cc/g carrier. In a case where the pore volume is within the range described above, pores contributing to transportation of a reaction gas are much secured, thus transport resistance of the reaction gas can be reduced. Therefore, the reaction gas can be rapidly transported to the surface of the catalytic metal stored in the mesopores, thus the catalytic metal is effectively used. Furthermore, in a case where the volume of mesopores is within the range described above, the catalytic metal can be stored (carried) in the mesopores, and the electrolyte and the catalytic metal in the catalyst layer can be physically separated from each other (contact between the electrolyte and the catalytic metal can be more effectively suppressed and prevented). As described above, in the embodiment in which the contact between the catalytic metal in the mesopores and the electrolyte is suppressed, the activity of the catalyst can be more effectively used, as compared with the case where the amount of the catalytic metal carried on the surface of the carrier is much. The pore volume of pores with a radius of 1 nm or more and less than 5 nm is herein also simply referred to as "the pore volume of mesopores".

The BET specific surface area [BET specific surface area of the catalyst per 1 g of the carrier ($m^2/g$ carrier)] (of the catalyst after carrying the catalytic metal) is not particularly limited, but is preferably 900 $m^2/g$ carrier or more, more preferably 1000 $m^2/g$ carrier or more, and further more preferably 1200 $m^2/g$ carrier or more. Also, the upper limit of the BET specific surface area of the catalyst is not particularly limited, but is preferably 3000 $m^2/g$ carrier or less, and more preferably 1800 m²/g carrier or less. In the case of the specific surface area as described above, sufficient mesopores can be secured, and also the particles of the catalytic metal can be carried with good dispersibility. The phrase "the particles of the catalytic metal with good dispersibility" herein refers to a state where the particles of the catalytic metal are carried while the particles are separated from each other, without agglomerating each other. When the particles of the catalytic metal are agglomerated and formed in a lump, local flux of gas would become large, and gas transport resistance would become large, in the vicinity of the lump of catalytic metal. On the other hand, when the individual particles of the catalytic metal are carried in a dispersed state, local flux in the vicinity of the individual particles would become small as compared with the above embodiment. Therefore, transport resistance of the reaction gas can be reduced, and the catalytic metal can be effectively used.

In addition, in the catalyst (b), the catalytic metal (catalyst component) has a specific surface area of 60 m²/g carrier or less. The catalytic metal has a specific surface area of preferably 5 to 60 m²/g carrier, more preferably 5 to 30 m²/g carrier, and particularly preferably 10 to 25 m²/g carrier. The surface of the catalytic metal is hydrophilic, and water generated by the catalytic reaction is likely to adsorb, thus water is likely to be retained in the mesopores in which the catalytic metal is stored. When water is retained in the mesopores, gas transport path would become narrow, and the diffusion rate of the reaction gas in water would be low, thus gas transportability would be reduced. On the other hand, the specific surface area of the catalytic metal is set relatively small as the above range, whereby the amount of water adsorbed to the surface of the catalytic metal can be reduced. As a result, water is hard to be retained in the mesopores, and the water content in the catalyst and also in the catalytic layer can be reduced. Therefore, transport resistance of the reaction gas can be reduced, and the catalytic metal is effectively used. The "specific surface area of the catalytic metal" in the present invention can be measured by the method described in, for example, Journal of Electroanalytical Chemistry 693 (2013) 34 to 41, etc. The "specific surface area of the catalytic metal" herein adopts the value measured by the following method.

(Method for Measuring a Specific Surface Area of Catalytic Metal)

With regard to the cathode catalyst layer, electrochemical effective surface area (ECA: Electrochemical surface area) is measured by cyclic voltammetry. Hydrogen gas humidified so as to be saturated at a measurement temperature is flowed into the opposed anode, and this anode is used as a reference electrode and a counter electrode. Nitrogen gas similarly humidified is flowed into the cathode, and valves of entrance and exit of the cathode are closed immediately before starting measurement, and nitrogen gas is sealed. Measurement is performed in this state, under the following conditions, using an electrochemical measuring system (manufactured by HOKUTO DENKO CORPORATION, model: HZ-5000).

Electrolyte solution: 1 M sulfuric acid (manufactured by Wako Pure Chemical Industries Ltd., for measurement of harmful metal)

Scanning rate: 50 mV/s

Number of cycles: 3 cycles

Lower limit voltage value: 0.02 V

Upper limit voltage value: 0.9 V

In the catalysts (a) and (c), at least a part of the catalytic metal is preferably carried inside the mesopores, and in the catalyst (b), at least a part of the catalytic metal is preferably carried inside the mesopores. Here, when the catalytic metal is carried in the mesopores, the size of the catalytic metal carried in the mesopores is preferably large as compared with the size of the mesopores (embodiment (i)). According to the configuration, the distance between the catalytic metal and the inner wall of the pore of the carrier is reduced, and the space in which water can be present is reduced, namely, the amount of water adsorbed to the surface of the catalytic metal is reduced. Also, water is subjected to interaction of the inner wall of the pore, whereby a reaction of forming a metal oxide becomes slow, and a metal oxide is hard to be formed. As a result, deactivation of the surface of the catalytic metal can be further suppressed. Therefore, the catalyst of this embodiment (i) can exhibit higher catalytic activity, namely, the catalytic reaction can be further promoted.

In the embodiment (i), the mode radius (modal radius) of pore distribution of mesopores (of the catalyst after carrying the catalytic metal) is 1 nm or more and 5 nm or less, preferably 1 nm or more and 4 nm or less, more preferably 1 nm or more and 3 nm or less, and further preferably 1 nm or more and 2 nm or less. With the mode radius of pore distribution as described above, the sufficient amount of the catalytic metal can be stored (carried) in the mesopores, and the electrolyte and the catalytic metal in the catalyst layer can be physically separated from each other (contact between the electrolyte and the catalytic metal can be more effectively suppressed and prevented). Therefore, the activity of the catalytic metal can be more effectively used.

Also, as described above, the catalyst has a proper R' value, thus the surface of the catalyst is partially covered with the electrolyte, and the entrance (opening) of mesopores (and micropores in some cases) are hard to be covered. Therefore, gas transportability to the catalytic metal carried in the mesopores is improved. In addition, by the presence of large-volume pores (mesopores), the action and effect of the present invention are further remarkably exhibited, and the catalyst reaction can be more effectively promoted.

In the embodiment (i), the average particle size (diameter) of the catalytic metal (catalytic metal particles) (of the catalyst after carrying the catalytic metal) is preferably 2 nm or more and 7 nm or less, and more preferably 3 nm or more and 5 nm or less. Namely, the average particle radius is preferably 1 nm or more and 3.5 nm or less, and more preferably 1.5 nm or more and 2.5 nm or less. When the average particle size of the catalytic metal is twice or more of the mode radius of pore distribution as described above (when the mode radius is half or less of the average particle size of the catalytic metal), the distance between the catalytic metal and the inner wall of the pore of the carrier is reduced, and the space in which water can be present is reduced, namely, the amount of water adsorbed to the surface of the catalytic metal is reduced. Also, water is subjected to interaction of the inner wall, whereby a reaction of forming a metal oxide becomes slow, and a metal oxide is hard to be formed. As a result, deactivation of the surface of the catalytic metal can be suppressed, and high catalytic activity can be exhibited. Namely, the catalytic reaction can be promoted. Also, the catalytic metal is relatively firmly carried in the pores (mesopores), and the contact with the electrolyte in the catalyst layer is more effectively suppressed and prevented. Moreover, elution due to potential change is prevented, and performance deterioration over time can be also suppressed. Therefore, catalytic activity can be further improved, namely, the catalytic reaction can be more efficiently promoted.

(Catalyst (d))

The catalyst (d) contains a catalyst carrier and a catalytic metal carried on the catalyst carrier and satisfies the following configurations (d-1) to (d-4):

(d-1) in the catalyst, a mode radius of pore distribution of pores with a radius of 1 nm or more is 1 nm or more and less than 5 nm;

(d-2) in the catalyst, the catalytic metal is carried inside the pores with a radius of 1 nm or more;

(d-3) the mode radius is half or less of the average particle size of the catalytic metal; and (d-4) t a pore volume of the pores with a radius of 1 nm or more and less than 5 nm is 0.4 cc/g carrier or more.

According to the catalyst having the configurations of the (d-1) to (d-4) described above, by taking a configuration that the catalytic metal is carried inside the pores (mesopores) in which the electrolyte cannot enter, the catalytic metal inside the pores forms three-phase boundary with water, and the catalyst can be effectively used. As a result, the activity of the catalyst can be improved. In detail, particularly, the (d-3) the mode radius of the pores is controlled to be half or less of the average particle size of the catalytic metal, whereby the distance between the catalytic metal and the inner wall of the pore of the carrier is reduced, and the space in which water can be present is reduced, namely, the amount of water adsorbed to the surface of the catalytic metal is reduced. Also, water is subjected to interaction of the inner wall of the pore, whereby a reaction of forming a metal oxide becomes slow, and a metal oxide is hard to be formed. As a result, deactivation of the surface of the catalytic metal can be further suppressed. Furthermore, as described above, the catalyst has a proper R' value, thus the surface of the catalyst is partially covered with the electrolyte, and the entrance (opening) of the mesopores is hard to be covered. Therefore, gas transportability to the catalytic metal carried in the mesopores is improved.

Thus, the catalyst (d) of this embodiment can exhibit high catalytic activity, namely, the catalysis can be promoted. Therefore, a membrane electrode assembly and a fuel cell having a catalyst layer using the catalyst (d) of this embodiment are excellent in power generation performance.

The shape and structure of the catalyst (d) are described by the schematic explanatory cross-sectional view shown in FIG. 3. Since the description according to FIG. 3 is as described above, the detailed description is herein omitted.

The catalyst (d) according to an embodiment of the present invention contains a catalytic metal and a carrier. The catalyst (d) has pores (mesopores). The catalytic metal is carried inside the mesopores. Also, it is sufficient that at least a part of the catalytic metal is carried inside the mesopores, and a part may be carried in the surface of the carrier. However, it is preferable that substantially all the catalytic metal is carried inside the mesopores, from the viewpoint of preventing the contact between the electrolyte and the catalytic metal in the catalyst layer. The phrase "substantially all the catalytic metal" is not particularly limited so long as it is the amount that can sufficiently improve the catalytic activity. The phrase "substantially all the catalytic metal" is present in an amount of preferably 50% by weight or more (upper limit: 100% by weight) and more preferably 80% by weight or more (upper limit: 100% by weight), in the whole catalytic metal.

The pore volume of the pores (of the catalyst after carrying the catalytic metal) is 0.4 cc/g carrier or more, preferably 0.45 to 3 cc/g carrier, and more preferably 0.5 to 1.5 cc/g carrier. When the pore volume is in the above range, more catalytic metal can be stored (carried) in the mesopores, and the electrolyte and the catalytic metal in the catalyst layer can be physically separated from each other (contact between the electrolyte and the catalytic metal can be more effectively suppressed and prevented). Therefore, the activity of the catalytic metal can be more effectively used. In addition, by the presence of many mesopores, the catalytic reaction can be more effectively promoted.

The mode radius (modal radius) of pore distribution of the pores (of the catalyst after carrying the catalytic metal) is 1 nm or more and less than 5 nm, preferably 1 nm or more and 4 nm or less, more preferably 1 nm or more and 3 nm or less, and further preferably 1 nm or more and 2 nm or less. In the case of the mode radius of pore distribution as described above, a sufficient amount of the catalytic metal can be stored (carried) in the mesopores, and the electrolyte and the catalytic metal in the catalyst layer can be physically separated from each other (contact between the electrolyte and the catalytic metal can be more effectively suppressed and prevented). Therefore, the activity of the catalytic metal can be more effectively used. Furthermore, as described above, the catalyst has a proper R' value, thus the surface of the catalyst is partially covered with the electrolyte, and the entrance (opening) of the mesopores is hard to be covered. Therefore, gas transport resistance in the catalyst can be further reduced. In addition, by the presence of large-volume pores (mesopores), the action and effect according to the present invention are further remarkably exhibited, and the catalytic reaction can be more effectively promoted.

The BET specific surface area [BET specific surface area of the catalyst per 1 g of the carrier ($m^2/g$ carrier)] (of the catalyst after carrying the catalytic metal) is not particularly limited, but is preferably 900 $m^2/g$ carrier or more, more preferably 1000 $m^2/g$ carrier or more, further more preferably 1000 to 3000 $m^2/g$ carrier, and particularly preferably 1000 to 1800 $m^2/g$ carrier. In the case of the specific surface area as described above, further more catalytic metal can be stored (carried) in the mesopores. In addition, the electrolyte and the catalytic metal in the catalyst layer can be physically separated from each other (contact between the electrolyte and the catalytic metal can be more effectively suppressed and prevented). Thus, the activity of the catalytic metal is more effectively used. Also, by the presence of many pores (mesopores), the action and effect according to the present invention are further remarkably exhibited, and the catalytic reaction can be more effectively promoted.

It is sufficient that the catalyst contained in the electrode catalyst layer satisfies at least one of the above (a) to (d). Among them, the catalyst preferably satisfies the above (a) or (b), and particularly preferably satisfies the (a), from the viewpoint of securing a transport path of gas by the micropores.

In addition, two or more of the above (a) to (d) are preferably satisfied, from the viewpoint of further improving gas transportability.

(Catalyst Carrier)

The catalyst carrier contains carbon as a main component. As used herein, the phrase "contain(s) carbon as a main component" includes both "consist(s) only of carbon", and "consist(s) substantially of carbon", and an element other than carbon may be incorporated. The phrase "consist(s) substantially of carbon" means that 80% by weight or more of a whole, and preferably 95% by weight or more of a whole (upper limit: less than 100% by weight) is composed of carbon.

The catalyst carrier is not particularly limited, but is preferably carbon powder. Furthermore, the R' value is substantially the same also after the catalyst carrying process set forth below, thus in terms of satisfying the condition of the above (I), it is preferable that the catalyst carrier also satisfies the above (I):

the ratio $R'$ of $D'$ intensity to $G$ intensity($D'/G$ intensity ratio) is more than 0.6 and 0.8 or less. (I)

According to the above (I), the carbon powder has an appropriate amount of highly hydrophilic edge part. Therefore, using such carbon powder in the catalyst, the surface of the catalyst has proper hydrophilicity. As a result, the electrolyte having hydrophobicity partially covers the surface of the catalyst, thus gas transportability is improved. In consideration of further improvement in gas transportability, the R' value is preferably more than 0.61 and 0.8 or less, more preferably more than 0.66 and 0.75 or less, and is further preferably 0.67 or more and less than 0.74.

A BET specific surface area of the catalyst carrier is not particularly limited as long as it is a specific surface area sufficient to carry the catalyst component in a highly dispersed manner. The BET specific surface area of the carrier is substantially equivalent to the BET specific surface area of the catalyst. The BET specific surface area of the carrier is preferably 900 $m^2/g$ carrier or more, more preferably 1000 $m^2/g$ carrier or more, and particularly preferably 1100 $m^2/g$ carrier or more. Also, the upper limit of the BET specific surface area of the carrier is not particularly limited, but is preferably 3000 $m^2/g$ carrier or less, and more preferably 1800 $m^2/g$ carrier or less. In the case of the specific surface area as described above, sufficient mesopores and sufficient micropores in some cases can be secured, thus furthermore catalytic metal can be stored (carried) in the mesopores with better dispersibility. Also, mesopores and micropores in some cases sufficient for gas transportation can be secured, thus gas transport resistance can be further reduced. In addition, the electrolyte and the catalytic metal in the catalyst layer can be physically separated from each other (contact between the electrolyte and the catalytic metal can be more effectively suppressed and prevented). Therefore, the activity of the catalytic metal can be more effectively used. Moreover, local flux in the vicinity of the catalytic metal particles becomes small, thus a reaction gas is rapidly transported, and the catalytic metal is effectively used. Also, by the presence of many pores (mesopores) and micropores in some cases, the action and effects by the present invention can be further remarkably exhibited, and the catalytic reaction can be more effectively promoted. Also, the balance between dispersibility of the catalyst component on the catalyst carrier and effective utilization rate of the catalyst component can be properly controlled. In addition, the micropores act as a transport path of gas, and three-phase boundary are more remarkably formed by water, thus catalytic activity can be further improved.

When the catalyst satisfies the requirement of any of the above configurations (a) to (d), it is preferable that the catalyst carrier also satisfies the same requirement of the configurations (a) to (d).

It is preferable that the catalyst carrier satisfies at least one of the following configurations (1) to (3). (1) (a-1) the catalyst carrier has pores with a radius of less than 1 nm (primary pore) and pores with a radius of 1 nm or more (primary pore); and (a-2) the catalyst carrier has a pore volume of the pores with a radius of less than 1 nm of 0.3 cc/g carrier or more. (2) (a-1) the catalyst carrier has pores with a radius of less than 1 nm and pores with a radius of 1 nm or more; and (c-1) the catalyst carrier has a mode radius of pore distribution of the pores with a radius of less than 1 nm of 0.3 nm or more and less than 1 nm. (3) (d-1) the catalyst carrier has a mode radius of pore distribution of the pores with a radius of 1 nm or more of 1 nm or more and less than 5 nm; and (d-4) the catalyst carrier has a pore volume of the pores with a radius of 1 nm or more and less than 5 nm of 0.4 cc/g carrier or more. Furthermore, in (3), it is preferable that (b-2) the catalyst carrier has a pore volume of the pores with a radius of 1 nm or more and less than 5 nm of 0.8 cc/g carrier or more. More preferable range of the pore volume of micropores in (a-2), that of the mode radius of pore distribution of micropores in (c-1), that of the mode radius of pore distribution of pores with a radius of 1 nm or more in (d-1), that of the pore volume of the pores with a radius of 1 nm or more and less than 5 nm in (d-4) and the like are the same as those described in the sections of the catalysts (a) to (d).

In the present invention, so long as having the pore distribution of micropores and mesopores as described above in the catalyst, a granular porous carrier as described above is not necessarily used.

To be specific, the carrier may also include unwoven fabrics, carbon paper and carbon cloth formed from carbon fibers constituting a gas diffusion layer, and the like. Here, the catalyst can be directly adhered to the unwoven fabrics, carbon paper and carbon cloth and the like which are made of carbon fibers constituting a gas diffusion layer of the membrane electrode assembly.

(Catalytic Metal)

The catalytic metal constituting the catalyst has a function of the catalysis of electrochemical reaction. The catalytic metal used in the anode catalyst layer is not particularly limited so long as it provides catalysis to oxidation reaction of hydrogen, and a known catalyst can be similarly used. In addition, the catalytic metal used in the cathode catalyst layer is not also particularly limited so long as it provides catalysis to reduction reaction of oxygen, and a known catalyst can be similarly used. Specifically, the catalytic metal can be selected from metals such as platinum, ruthenium, iridium, rhodium, palladium, osmium, tungsten, lead, iron, copper, silver, chromium, cobalt, nickel, manganese, vanadium, molybdenum, gallium, and aluminum, and alloys thereof.

Of these, those that contain at least platinum are preferably used, in terms of improving catalytic activity, poisoning resistance to carbon monoxide and the like, heat resistance, and the like. Namely, the catalytic metal is preferably platinum or contains platinum and a metal component other than platinum, and is more preferably platinum or a platinum-containing alloy. Such catalytic metal can exhibit high activity. The alloy compositions preferably contain 30 to 90 atom % of platinum, and the content of the metal to be alloyed with platinum is preferably 10 to 70 atom %, although it depends to the type of metal to be alloyed. Alloy is generally obtained by adding one or more kinds of metal elements or non-metallic elements to a metal element, and is a general term for those which have metallic characteristics. The structure of an alloy includes an eutectic alloy which is a mixture of crystals of different component elements, a solid solution which is formed by completely molten component elements, an alloy which component elements form an intermetallic compound or a compound of a metal with a non-metal, or the like, and may be any of them in the present application. In this case, the catalytic metal used in the anode catalyst layer and the catalytic metal used in the cathode catalyst layer may be appropriately selected from the above. Unless otherwise noted herein, the descriptions for catalytic metals for the anode catalyst layer and for the cathode catalyst layer are used interchangeably. However, the catalytic metals for the anode catalyst layer and for the cathode catalyst layer need not be the same, and may be appropriately selected so as to provide the desired action described above.

The shape and size of the catalytic metal (catalyst component) are not particularly limited, and any shape and size similar to those of a known catalyst components can be adopted. For example, those having granular, scaly, or layered shape can be used, and granular shape is preferred.

An average particle size (diameter) of the catalytic metal (catalytic metal particles) is not particularly limited. For example, when the catalyst (a) and/or (c) is used as a catalyst, the average particle size of the catalytic metal (catalytic metal particles) is preferably 3 nm or more, more preferably more than 3 nm and 30 nm or less, and particularly preferably more than 3 nm and 10 nm or less. When an average particle size of the catalytic metal of 3 nm or more, the catalytic metal would be relatively firmly carried in the mesopores, and the contact with the electrolyte in the catalyst layer would be more effectively suppressed and prevented. In addition, the micropores would be remained without being blocked by the catalytic metal, and transport path of gas would be more favorably secured, and gas transport resistance can be further reduced. Moreover, elution due to potential change is prevented, and performance deterioration over time can be also suppressed. Therefore, catalytic activity can be further improved, namely, the catalytic reaction can be more efficiently promoted. On the other hand, when the average particle size of the catalytic metal particles is 30 nm or less, the catalytic metal can be carried inside the mesopores of the carrier by a simple method, and the electrolyte coverage of the catalytic metal can be reduced. In addition, in the case of using the catalyst (b) as a catalyst, the average particle size of the catalytic metal (catalytic metal particles) is preferably more than 3 nm. The average particle size of the catalytic metal is more preferably more than 3 nm to 30 nm, and particularly preferably more than 3 nm to 10 nm. When the average particle size of the catalytic metal is more than 3 nm, the specific surface area of the catalytic metal can be made small. As a result, as described above, the amount of water adsorbed to the surface of the catalytic metal can be reduced, and mesopores contributing to transportation of a reaction gas can be much secured. Therefore, transport resistance of the reaction gas can be reduced. Moreover, elution due to potential change can be prevented, and performance deterioration over time can be also suppressed. Therefore, catalytic activity can be further improved. Namely, the catalytic reaction can be more efficiently promoted. On the other hand, when the average particle size of the catalytic metal particles is 30 nm or less, the catalytic metal can be carried inside the mesopores of the carrier by a simple method, and the electrolyte coverage of the catalytic metal can be reduced. Furthermore, in the case of using the catalyst (d) as a catalyst, the average particle size of the catalytic metal is twice or more of the mode radius of pore distribution of mesopores (the mode radius is half or less of the average particle size of the catalytic metal). Here, the average particle size of the catalytic metal (catalytic metal particles) is preferably 2 nm or more and 7 nm or less, and more preferably 3 nm or more and 5 nm or less. Namely, the average particle radius is preferably 1 nm or more and 3.5 nm or less, and more preferably 1.5 nm or more and 2.5 nm or less. When half of the average particle size of the catalytic metal is twice or more of the mode radius of pore distribution as described above (when the mode radius is half or less of the average particle size of the catalytic metal), the distance between the catalytic metal and the inner wall of the pore of the carrier would be reduced, and the space in which water can be present would be reduced, namely, the amount of water adsorbed to the surface of the catalytic metal would be reduced. Also, water is subjected to interaction with the inner wall, which would delay reaction of forming a metal oxide, and a metal oxide would be hard to be formed. As a result, deactivation of the surface of the catalytic metal can be suppressed, and high catalytic activity can be exhibited. Namely, the catalytic reaction can be promoted. Also, the catalytic metal would be relatively firmly carried in the pores (mesopores), and the contact with the electrolyte in the catalyst layer can be more effectively suppressed and prevented. Moreover, elution due to potential change can be prevented, and performance deterioration over time can be also suppressed. Therefore, catalytic activity can be further improved, namely, the catalytic reaction can be more efficiently promoted.

The "average particle size of the catalytic metal particles" or the "average particle radius of the catalytic metal particles" in the present invention can be measured by a crystallite radius obtained from the half-band width of the diffraction peak of the catalytic metal component in the X-ray diffraction, or an average value of the particle radius of the catalytic metal particles examined using a transmission-type electron microscope (TEM). The "average particle radius of the catalytic metal particles" herein is a crystallite radius obtained from the half-band width of the diffraction peak of the catalytic metal component in the X-ray diffraction. Further, the "average particle size of the catalytic metal particles" is a value twice as much as the "average particle radius of the catalytic metal particles".

In this embodiment, the content of the catalytic metal per unit catalyst coated area ($mg/cm^2$) is not particularly limited so long as sufficient dispersity of the catalyst on the carrier and power generation performance can be obtained, and is, for example, 1 $mg/cm^2$ or less. However, in the case where the catalyst contains platinum or a platinum-containing alloy, the platinum content per unit catalyst coated area is preferably 0.5 $mg/cm^2$ or less. The use of expensive noble-metal catalysts typified by platinum (Pt) and platinum alloys is a factor of expensive fuel cells. Accordingly, it is preferable that the use amount of expensive platinum (the platinum content) is decreased to the above-mentioned range to reduce the costs. The lower limit value is not particularly limited so long as power generation performance can be obtained. In this embodiment, the control of the porous structure of the carrier allows activity per catalyst weight to be improved, thus it is possible to reduce the use amount of the expensive catalyst.

As used herein, the induction coupled plasma emission spectrography (ICP) is used for measuring (confirming) the "catalytic metal (platinum) content per unit catalyst coated area ($mg/cm^2$)". The method for obtaining desired "catalytic metal (platinum) content per unit catalyst coated area ($mg/cm^2$)" can be also easily performed by a person skilled in the art, and the content can be adjusted by controlling the composition (catalyst concentration) and coating amount of slurry.

In addition, a carried amount (also referred to as "a carrying ratio" or "catalyst carrying ratio") of the catalytic metal in the carrier is not particularly limited. For example, in the case of using at least one of the catalysts (a), (c) and (d) as a catalyst, the carrying ratio is preferably 10 to 80% by weight, and more preferably 20 to 70% by weight, relative to the total amount of the catalyst carrying body (namely, the carrier and the catalytic metal). The carrying ratio in the above-mentioned range is preferable by reason of allowing sufficient dispersity of the catalyst components on the carrier, the improvement in power generation performance, the economic advantages, and the catalytic activity per unit weight. Moreover, in the case of using the catalyst (b) as a catalyst, a ratio of the catalytic metal relative to the catalyst is preferably a ratio occupied by the weight of the carried catalytic metal, relative to the total amount of the catalyst (total amount of the carrier and the catalytic metal). The catalyst carrying ratio is preferably 40% by weight or less. Furthermore, the catalyst carrying ratio is more preferably 30% by weight or less. On the other hand, the lower limit of the catalyst carrying ratio is preferably 5% by weight and more preferably 20% by weight. When the catalyst carrying ratio is in the above range, a catalyst having a small specific surface area of the catalytic metal can be obtained. As a result, the amount of water adsorbed to the surface of the catalytic metal can be reduced, and mesopores contributing to transportation of a reaction gas can be much secured. Therefore, transport resistance of the reaction gas can be reduced, and thus the reaction gas is rapidly transported. Moreover, the catalytic metal is effectively used, and consequently, the catalytic activity can be further improved. Namely, the catalytic reaction can be more efficiently promoted. Also, according to this embodiment, the used catalytic metal may be a relatively small amount, which is preferable also from the economic viewpoint. Here, the "catalyst carrying ratio" in the present invention is a value obtained by measuring the weights of the carrier before carrying the catalytic metal and the catalyst after carrying the catalytic metal.

(Electrolyte)

The catalyst layer of the present invention contains an electrolyte in addition to the above catalyst. Here, the electrolyte is not particularly limited, but is preferably an ion-conducting polymer electrolyte. The above polymer electrolyte is also called as the proton-conducting polymer by reason of playing a role of transmitting protons produced around the catalytic active material on the fuel electrode side.

The polymer electrolyte is not particularly limited, and can be properly referred to the conventionally known knowledge. The polymer electrolyte is roughly classified into a fluorine-based polymer electrolyte and a hydrocarbon-based polymer electrolyte, depending on the kind of ion exchange resin that is a constituent material. Among them, a fluorine-based polymer electrolyte is preferable. Namely, the electrolyte is preferably a fluorine-based polymer electrolyte.

The fluorine-based polymer electrolyte has hydrophobicity, thus repels to the hydrophilic surface of the catalyst having the R' value within the above range, and the adsorption amount is reduced. Consequently, it is likely to have a structure in which the electrolyte partially covers the surface of the catalyst. Accordingly, it is likely to contribute to the improvement in gas transportability, thus it is preferable to use a fluorine-based polymer electrolyte as an electrolyte.

Examples of the ion exchange resin that constitutes a fluorine-based polymer electrolyte include perfluorocarbon sulfonic acid based polymers such as Nafion (registered trademark, manufactured by Dupont), Aciplex (registered trademark, manufactured by Asahi Kasei Chemicals Corp.), and Flemion (registered trademark, manufactured by Asahi Glass Co.), perfluorocarbon phosphonic acid based polymers, trifluorostyrene sulfonic acid based polymers, ethylenetetrafluoroethylene-g-styrene sulfonic acid based polymers, ethylene-tetrafluoroethylene copolymers, polyvinylidenefluoride-perfluorocarbon sulfonic acid based polymers, and the like. These fluorine-based polymer electrolytes are preferably used and, a fluorine-based polymer electrolyte formed from a perfluorocarbon sulfonic acid group polymer is particularly preferably used, from the viewpoint of excellent heat resistance, chemical stability, durability and mechanical strength.

The hydrocarbon-based electrolyte specifically includes sulfonated polyether sulfon (S-PES), sulfonated polyaryletherketone, sulfonated polybenzimidazolealkyl, phosphorylated polybenzimidazolealkyl, sulfonated polystyrene, sulfonated polyether etherketone (S-PEEK), sulfonated polyphenylene (S-PPP), and the like. These hydrocarbon-based polymer electrolytes are preferably used from the manufacturing viewpoint that their raw materials are inexpensive, their manufacturing processes are simple, and their materials are highly selectable. The above-mentioned ion exchange resins may be used singly in only one kind or in combinations of two or more kinds. Also, the above-mentioned materials are not exclusive, and other materials can be used as well.

The conductivity of protons is important in the polymer electrolyte which serves to transmit protons. Here, in the case where EW of the polymer electrolyte is too large, ion conductivity of the whole catalyst layer would deteriorate. Accordingly, the catalyst layer of this embodiment preferably contains the polymer electrolyte with small EW. Specifically, the catalyst layer according of this embodiment contains preferably a polymer electrolyte with an EW of 1500 g/mol or less, more preferably a polymer electrolyte with an EW of 1200 g/mol or less, and particularly preferably a polymer electrolyte with an EW of 1100 g/mol or less.

On the other hand, in the case where EW is too small, the hydrophilicity is so high that smooth movement of water would be difficult. From such a viewpoint, the EW of the polymer electrolyte is preferably 600 g/mol or more. Incidentally, EW (Equivalent Weight) represents the equivalent weight of an exchange group having proton conductivity. The equivalent weight is dry weight of an ion exchange membrane per equivalent of the ion exchange group, and represented by a unit of "g/mol".

In addition, it is preferable that the catalyst layer contains two or more kinds of polymer electrolytes with different EW in the power generation surface, and a polymer electrolyte with a lowest EW among polymer electrolytes is used in the region with a relative humidity of gas in the passage of 90% or less. By adopting such material arrangement, the resistance value becomes small, irrespective of the current density region, and battery performance can be improved. EW of the polymer electrolyte used in the region with a relative humidity of gas in the passage of 90% or less, i.e., the polymer electrolyte with a lowest EW is desired to be 900 g/mol or less. Whereby, the above-mentioned effects can be more secured and remarkable.

Furthermore, it is preferable to provide the polymer electrolyte with the lowest EW in a region with a temperature higher than an average temperature of the inlet and outlet of cooling water. Whereby, the resistance value can decrease, irrespective of the current density region, and battery performance can be further improved.

Furthermore, it is desired to provide the polymer electrolyte with the lowest EW in a region within the range of ⅗ from at least one of gas supply ports of fuel gas and oxidant gas, relative to a passage length, from the viewpoint of reducing resistance value of fuel cell system.

The catalyst layer may contain an additive such as a water-repellent agent such as polytetrafluoroethylene, polyhexafluoropropylene or tetrafluoroethylene-hexafluoropropylene copolymer, a dispersing agent such as a surfactant, a thickener such as glycerin, ethylene glycol (EG), polyvinyl alcohol (PVA) or propylene glycol (PG), and a pore-forming material, as necessary.

The thickness of the catalyst layer (dry film thickness) is preferably 0.05 to 30 µm, more preferably 1 to 20 µm, and further preferably 2 to 15 µm. Incidentally, the above thickness is applied to both the cathode catalyst layer and the anode catalyst layer. However, the thicknesses of the cathode catalyst layer and the anode catalyst layer may be the same or different.

(Method for Producing Catalyst Layer)

The method for producing the catalyst layer of the present invention is not particularly limited, and for example, the known methods such as the method described in JP 2010-21060 A are applied, or properly modified and applied. Preferable embodiments will be described below.

First, a catalyst is prepared. The catalyst can be obtained by carrying a catalytic metal in a catalyst carrier.

The method for producing the catalysts (a) to (d) having specific pore distribution as described above is not particularly limited, and it is usually important that the pore distribution (micropores and mesopores in some cases) of the carrier is controlled to be the pore distribution described above.

Specifically, as the method for producing a carrier having micropores and mesopores, and a pore volume of micropores of 0.3 cc/g carrier or more, for producing the catalyst (a); the method for producing a carrier having mesopores, and a pore volume of mesopores of 0.8 cc/g carrier or more, for producing the catalyst (b); the method for producing a carrier having micropores and mesopores, and a mode radius of pore distribution of the micropores of 0.3 nm or more and less than 1 nm, for producing the catalyst (c); and the method for producing a carrier having mesopores with a mode radius of pore distribution of 1 nm or more and less than 5 nm, and a pore volume of mesopores with a radius of 1 nm or more and less than 5 nm of 0.4 cc/g carrier or more, for producing the catalyst (d), the methods described in publications such as JP 2010-208887 A (US 2011/318254 A1, the same applies hereafter) and WO 2009/75264 (US 2011/058308 A1, the same applies hereafter) are preferably used.

The conditions of the heat treatment for obtaining a carrier having desired pores are different depending on the material, and are properly determined so as to obtain a desired porous structure. Generally, the high heating temperature brings a tendency for a mode diameter of the pore distribution to shift toward the direction in which the pore diameter becomes large. Also, the high heating temperature brings small R' value and a tendency to reduce hydrophilicity of the surface of the carrier. Therefore, such heat treatment conditions may be determined in accordance with the material while confirming the porous structure and the R' value and can be easily determined by a person skilled in the art.

Furthermore, in the above catalysts (a) to (d), in order to have an R' value of more than 0.6 and 0.8 or less, it is important to control the R' value of the carrier to the above range. Specifically, it is preferable to produce a carrier satisfying the above configurations (I) and (II), then directly (without performing heat treatment) proceed to the step for carrying a catalytic metal to the carrier. Or, when the heat treatment is performed as necessary, it is preferable to use mild treatment conditions.

Here, the heat treatment conditions in heat treating the carrier are not particularly limited so long as the conditions can achieve the above configurations (I) and (II). Specifically, the heat treatment temperature is preferably 1300° C. or less, more preferably 1200° C. or less, and particularly preferably 1000° C. or less. Under such conditions, the R' value of the carrier before heat treatment can be maintained, and it would be suppressed to impair hydrophilicity.

In addition, the temperature rising rate in the heat treatment is preferably 100 to 1000° C./hour and is particularly preferably 200 to 800° C./hour. The heat treatment temperature (retention time at a predetermined heat treatment temperature) is preferably 0 (i.e., no heat treatment) to 5 hours, and particularly preferably 0 to 3 hours. The heat treatment can be performed in an air atmosphere, or an inert atmosphere such as argon gas or a nitrogen gas. Under such conditions, a carrier for constituting a catalyst satisfying the above configurations (I) and (II) can be easily obtained. Incidentally, when the heat treatment conditions exceed the above upper limit (heat treatment conditions are too severe), the edge amount of carbon (graphene) would be too small, and it would be possible that hydrophilicity cannot be exhibited. Furthermore, when the heat treatment conditions are too severe, graphitization would proceed too much, and it would be possible that the BET specific surface area of carbon (graphene) is too small, which is not preferable.

On the other hand, a carrier precursor (carbon material) satisfying the above configuration (II) is produced, and when the R' value of the carrier precursor is more than 0.8, it is possible to reduce the R' value by performing the heat treatment under the conditions severer than the above heat treatment conditions, and/or performing an acid treatment. Therefore, the carrier satisfying the above configurations (I) and (II) may be obtained by performing such treatment. Such acid treatment and heat treatment conditions may be determined depending on the material while confirming the porous structure and the R' value, and can be easily determined by a person skilled in the art.

The material of the carrier constituting the catalyst is not particularly limited, but those likely to form the catalyst carrier satisfying the above configurations (I) and (II) are preferable. In addition, the material that can form pores having pore volume or mode diameter (primary pores) inside the carrier and has sufficient specific surface area and sufficient electron conductivity for carrying the catalyst component inside the pores (mesopores) in a dispersion state is preferable. Specifically, the main component is carbon. More specifically, examples include carbon particles such as carbon black (such as Ketjen black, oil furnace black, channel black, lamp black, thermal black and acetylene black), and activated carbon. The phrase "the main component is carbon" means that carbon atoms are contained as a main component, and includes both "consisting only of carbon atoms" and "consisting substantially of carbon atoms", and elements except carbon atoms may be contained. The phrase "consisting substantially of carbon atoms" means that the mixing of approximately 2 to 3% by weight or less of impurities may be allowable.

Next, a catalytic metal is carried on the catalyst carrier to obtain catalyst powder.

The method for carrying the catalytic metal on the catalyst carrier is not particularly limited. Preferably, the method includes (i) a step of depositing a catalytic metal on the surface of the catalyst carrier (deposition step) and (ii) a step of performing heat treatment, after the deposition step, to increase the particle size of the catalytic metal (heat treatment step). The above method increases the particle size of the catalytic metal by subjecting the catalytic metal to heat treatment after deposition. Therefore, a catalytic metal with a large particle size can be carried inside the pores (especially mesopores) of the catalyst carrier.

A preferred embodiment of the method for producing the catalyst will be described below, but the present invention is not limited to the following embodiment.

(i) Deposition Step

In this step, the catalyst metal is deposited on the surface of the catalytic carrier. This step is a known method, and for example, a method of immersing a catalyst carrier in a precursor solution of the catalytic metal, then reducing is preferably used.

The precursor of the catalytic metal is not particularly limited, and properly selected depending on the kind of the catalytic metal to be used. Specifically, chlorides, nitrates, sulfates, chlorides, acetates and amine compounds of the catalytic metal such as above-mentioned platinum and the like can be exemplified. More specifically, chlorides such as platinum chloride (hexachloroplatinate hexahydrate), palladium chloride, rhodium chloride, ruthenium chloride and cobalt chloride, nitrates such as palladium nitrate, rhodium nitrate and iridium nitrate, sulfates such as palladium sulfate and rhodium sulfate, acetates such as rhodium acetate, ammine compounds such as dinitrodiammine platinum nitric acid and dinitrodiammine palladium and the like are preferably exemplified. Also, the solvent used to prepare the precursor solution of the catalytic metal is not particularly limited so long as it can dissolve the precursor of the catalytic metal, and is properly selected depending on the kind of the precursor of the catalytic metal to be used. Specific examples include water, acids, alkalis, organic solvents and the like. The concentration of the precursor of the catalytic metal in the precursor solution of the catalytic metal is not particularly limited, but is preferably 0.1 to 50% by weight and more preferably 0.5 to 20% by weight, in terms of metals.

The reducing agent includes hydrogen, hydrazine, sodium thiosulfate, citric acid, sodium citrate, L-ascorbic acid, sodium borohydride, formaldehyde, methanol, ethanol, ethylene, carbon monoxide, and the like. A gaseous substance at normal temperature such as hydrogen can also be supplied by bubbling. The amount of the reducing agent is not particularly limited so long as it is the amount that can reduce the precursor of the catalytic metal to a catalytic metal, and the known amount is similarly applicable.

The deposition conditions are not particularly limited so long as the catalytic metal can be deposited on a catalyst carrier. For example, the deposition temperature is preferably a temperature around the boiling point of the solvent, and more preferably a room temperature to 100° C. Also, the deposition time is preferably 1 to 10 hours and more preferably 2 to 8 hours. The deposition step may be performed while stirring and mixing, as necessary.

Whereby, the precursor of the catalytic metal is reduced to a catalytic metal, and the catalytic metal is deposited (carried) on the catalyst carrier.

(ii) Heat Treatment Step

In this step, after the (i) deposition step, heat treatment is performed to increase the particle size of the catalytic metal. It is preferable that the heat treatment in this step is performed under the mild conditions so as not to change the R' value of the carrier.

The heat treatment condition is not particularly limited so long as it is the condition that can increase the particle size of the catalytic metal. For example, the heat treatment temperature is preferably 300 to 1200° C., more preferably 500 to 1150° C., and particularly preferably 700 to 1000° C. Also, the heat treatment time is preferably 0.02 to 3 hours, more preferably 0.1 to 2 hours, and particularly preferably 0.2 to 1.5 hours. The heat treatment step may be performed in a hydrogen atmosphere.

Whereby, the particle size of the catalytic metal is increased in the catalyst carrier (especially, in the mesopores of the catalyst carrier). Therefore, the catalytic metal particles are hard to desorb (from the catalyst carrier) to the outside of the catalytic system. Therefore, the catalyst can be more effectively used.

Subsequently, a catalyst ink containing the catalyst obtained above, a polymer electrolyte and a solvent is prepared. The solvent is not particularly limited, and the normal solvent used in forming a catalyst layer can be similarly used. Specific examples include water, cyclohexanol, lower alcohols with a carbon number of 1 to 4, propylene glycol, benzene, toluene, xylene and the like. Other than these, acetic acid butyl alcohol, dimethyl ether, ethylene glycol and the like may be used as a solvent. These solvents may be used singly in one kind or in mixed liquid of two or more kinds.

Among them, a water-alcohol mixed solvent with a high content ratio of water is preferably used as the solvent. It is preferable since a mixed solvent with a high content ratio of water is used as a dispersion medium, thereby preventing the electrolyte from covering the entrance of mesopores. Here, a mixed weight ratio of water and alcohol is preferably 55/45 to 95/5, and more preferably 60/40 or more and less than 91/9.

Namely, the present invention provides a method for producing an electrode catalyst layer for fuel cell, comprising preparing a coating liquid containing a catalyst containing a catalyst carrier having carbon as a main component and a platinum-containing catalytic metal carried in the catalyst carrier, an electrolyte, and a water-alcohol mixed solvent with a mixing weight ratio of water and alcohol of 55/45 to 95/5, and applying the coating liquid to form an electrode catalyst layer.

A mixed solvent with a high content ratio of water is used as a dispersion medium as described above, thereby preventing the electrolyte from covering the entrance of mesopores. Here, the mixing weight ratio of water and alcohol is controlled to 55/45 or more, thereby preventing the electrolyte from covering the opening of mesopores of the catalysts (a) to (d). On the other hand, the mixing weight ratio of water and alcohol is controlled to 95/5 or less, thereby preventing the catalyst from excessively agglomerating and increasing in size, also, preventing the catalyst and the electrolyte from being excessively phase-separated.

Water is not particularly limited, and pure water, ion-exchange water, distilled water and the like can be used. Also, alcohol is not particularly limited. Specific examples include methanol, ethanol, 1-propanol (n-propyl alcohol), 2-propanol, 1-butanol, 2-methyl-1-propanol, 2-butanol, 2-methyl-2-propanol, cyclohexanol, and the like. Among them, methanol, ethanol, 1-propanol (n-propyl alcohol), 2-propanol, 1-butanol, 2-methyl-1-propanol, 2-butanol and 2-methyl-2-propanol are preferable. The above alcohols may be used singly or in mixed liquid of two or more kinds. Namely, it is preferable that the alcohol is at least one kind selected from the group consisting of methanol, ethanol, 1-propanol (n-propyl alcohol), 2-propanol, 1-butanol, 2-methyl-1-propanol, 2-butanol and 2-methyl-2-propanol. By using such highly hydrophilic lower alcohol, uneven distribution of the electrolyte can be prevented. The alcohol can be used singly in only one kind or in a mixture of two or more kinds.

As described above, the polymer electrolyte is roughly classified into a fluorine-based polymer electrolyte and a hydrocarbon-based polymer electrolyte, depending on the kind of ion exchange resin which is a constituent material. Among them, a fluorine-based polymer electrolyte is preferable. Namely, the electrolyte is preferably a fluorine-based polymer electrolyte. By using hydrophobic fluorine-based polymer electrolyte as described above, the electrolyte is further likely to agglomerate by increasing the water content in the solvent.

The amount of the solvent constituting the catalyst ink is not particularly limited so long as it is an amount such as to allow the electrolyte to be completely dissolved. Specifically, the concentration of the solid content containing the catalyst powder, the polymer electrolyte and the like is preferably 1 to 50% by weight and more preferably about 5 to 30% by weight in the electrode catalyst ink.

In addition, the ratio ($W_f/W_c$) of the weight of the polymer electrolyte ($W_f$) to the weight of the carrier ($W_c$) in the catalyst ink is preferably 0.5 to 1.5, and more preferably 0.7 to 1.3. Such a range allows the electrolyte likely to partially cover the surface of the catalyst.

Incidentally, in the case of using additives such as water-repellent agent, dispersing agent, thickener and pore-forming material, these additives may be added to the catalyst ink. In this case, the added amount of the additives is not particularly limited so long as it is an amount such as not to disturb the above effect of the present invention. For example, the added amount of each of the additives is preferably 5 to 20° by weight, relative to the total weight of the electrode catalyst ink.

Next, the catalyst ink is applied on the surface of a substrate. An application method on the substrate is not particularly limited and known methods can be used. Specifically, the application can be performed using a known method such as spray (spray coating) method, Gulliver printing method, die coater method, screen printing method, and doctor blade method.

In this case, a solid polyelectrolyte membrane (an electrolyte layer) and a gas diffusion substrate (a gas diffusion layer) can be used as the substrate onto which the catalyst ink is applied. In such a case, after forming the catalyst layer on the surface of a solid polyelectrolyte membrane (an electrolyte layer) or a gas diffusion substrate (a gas diffusion layer), an obtained laminated body may be directly used for producing a membrane electrode assembly. Alternatively, the catalyst layer may be obtained by forming the catalyst layer on the substrate which is a peelable substrate such as polytetrafluoroethylene (PTFE) [Teflon (registered trademark)] sheet, and then peeling the catalyst layer portion off the substrate.

Lastly, a coated layer (membrane) of the catalyst ink is dried under the air atmosphere or an inert gas atmosphere at room temperature to 180° C. for 1 to 60 minutes. Thus, the catalyst layer is formed.

[Membrane Electrode Assembly/Fuel Cell]

According to further another embodiment of the present invention, a membrane electrode assembly for fuel cell containing the above electrode catalyst layer for fuel cell is provided. Namely, a membrane electrode assembly for fuel cell having a solid polyelectrolyte membrane 2, a cathode catalyst layer arranged on one side of the electrolyte membrane, an anode catalyst layer arranged on the other side of the electrolyte membrane, and a pair of gas diffusion layers (4a and 4c) which sandwich the electrolyte membrane 2, the anode catalyst layer 3a and the cathode catalyst layer 3c is provided. Then, in this membrane electrode assembly, at least one of the cathode catalyst layer and the anode catalyst layer is the catalyst layer of the embodiment described above.

However, in consideration of the necessity for the improvement in proton conductivity and the improvement in the transport property (the gas diffusivity) of reactant gas (especially $O_2$), at least the cathode catalyst layer is preferably the catalyst layer of the embodiment described above. However, the catalyst layer according to the above-mentioned embodiment is not particularly limited; for example, the catalyst layer may be used as the anode catalyst layer, or as both the cathode catalyst layer and the anode catalyst layer.

According to further another embodiment of the present invention, a fuel cell having the membrane electrode assembly of the above-mentioned embodiment is provided. Namely, an embodiment of the present invention is a fuel cell having a pair of an anode separator and a cathode separator which sandwich the membrane electrode assembly of the above-mentioned embodiment.

The constituents of the PEFC 1 using the catalyst layer according to the above-mentioned embodiment will be described below with reference to FIG. 1. However, the features of the present invention are based on the catalyst layer. Therefore, the specific configurations of members except the catalyst layer constituting the fuel cell may be properly modified with reference to the conventionally known knowledge.

(Electrolyte Membrane)

The electrolyte membrane, for example, contains a solid polyelectrolyte membrane 2 such as can be seen in the configuration shown in FIG. 1. This solid polyelectrolyte membrane 2 has the function of allowing the protons generated in an anode catalyst layer 3a to be selectively transmitted to a cathode catalyst layer 3c along the membrane thickness direction during the operation of a PEFC 1. Also, the solid polyelectrolyte membrane 2 serves as a barrier to prevent the fuel gas supplied to the anode side from mixing with the oxidant gas supplied to the cathode side.

An electrolyte material composing the solid polyelectrolyte membrane 2 is not particularly limited, and can be properly referred to the conventionally known knowledge. For example, the fluorine-based polymer electrolyte and the hydrocarbon-based polymer electrolyte, which are described as the polymer electrolyte in the above, may be used. In this case, it is not necessary to use the same as the polymer electrolyte used for the catalyst layer.

The thickness of the electrolyte layer may be properly selected in consideration of the characteristics of the obtained fuel cell, and is not particularly limited. The thickness of the electrolyte layer is ordinarily approximately 5 to 300 μm. When the thickness of the electrolyte layer is within such a range, the balance between the strength during the manufacturing process of the membrane, the durability during usage, and output performance during usage can be properly controlled.

(Gas Diffusion Layer)

The gas diffusion layers (the anode gas diffusion layer 4a and the cathode gas diffusion layer 4c) have the function of promoting the diffusion of the gas (the fuel gas or the oxidant gas) supplied through the gas passages (6a and 6c) of the separator to the catalyst layers (3a and 3c), as well as the function as the electronic conduction path.

A material composing a substrate of the gas diffusion layers (4a and 4c) is not particularly limited, and can be properly referred to the conventionally known knowledge. Examples thereof include sheet-like materials with conductivity and porosity, such as fabrics made of carbon, paper-like paper-making material, felt and unwoven fabric. The thickness of the substrate may be properly determined in consideration of the characteristics of the obtained gas diffusion layer, and it may be approximately 30 to 500 µm. When the thickness of the substrate is a value within such a range, the balance between the mechanical strength and the diffusivity of gas, water and the like can be properly controlled.

The gas diffusion layer preferably contains water-repellent agent with the aim of enhancing water repellency to prevent a flooding phenomenon and the like. Examples of the water-repellent agents include, but not particularly limited to, fluorine-based polymer materials such as polytetrafluoroethylene (PTFE), polyfluorovinylidene (PVdF), polyhexafluoropropylene and tetrafluoroethylene-hexafluoropropylene copolymer (FEP), as well as polypropylene and polyethylene.

Also, in order to further improve water repellency, the gas diffusion layer may be such as to have a carbon particle layer comprising an aggregate of carbon particles containing the water-repellent agent (a microporous layer; MPL, not shown in the drawings) on the catalyst layer side of the substrate.

The carbon particles contained in the carbon particle layer are not particularly limited, and conventionally known materials such as carbon black, graphite and expanded graphite may be properly adopted. Among them, carbon black such as oil furnace black, channel black, lamp black, thermal black and acetylene black may be preferably used by reason of having excellent electron conductivity and large specific surface area. The average particle size of the carbon particles is preferably approximately 10 to 100 nm. Thus, high drainage by capillary force is obtained, and the contact with the catalyst layer also can be improved.

Examples of the water-repellent agent used for the carbon particle layer include the same as the above-mentioned water-repellent agent. Above all, the fluorine-based polymer materials may be preferably used by reason of being excellent in water repellency and corrosion resistance during the electrode reaction.

The preferable mixing ratio between the carbon particles and the water-repellent agent in the carbon particle layer is approximately 90:10 to 40:60 at weight ratio (carbon particles:water-repellent agent) in consideration of the balance between the water repellency and the electron conductivity. Incidentally, also the thickness of the carbon particle layer is not particularly limited and may be properly determined in consideration of the water repellency of the obtained gas diffusion layer.

(Method for Producing Membrane Electrode Assembly)

The method for producing the membrane electrode assembly is not particularly limited, and a conventionally known method can be used. For example, it is possible to use the method which comprises transferring by means of a hot press or coating a catalyst layer on a solid polyelectrolyte membrane, drying it, and joining a gas diffusion layer to it, or a method which comprises previously coating a catalyst layer on one side of a microporous layer side of a gas diffusion layer (or a substrate layer when a microporous layer is not included) and drying to prepare two gas diffusion electrodes (GDE), and joining these gas diffusion electrodes to both sides of a solid polyelectrolyte membrane by means of a hot press. The coating and assembly conditions of the hot press and the like may be properly adjusted, depending on the kinds (perfluorosulfonic acid-based and hydrocarbon-based) of the solid polyelectrolyte membrane and the polymer electrolyte in the catalyst layer.

(Separator)

The separator has the function of electrically connecting each cell in series when configuring the fuel cell stack by connecting in series a plurality of single cells of the fuel cell such as a polymer electrolyte fuel cell. Also, the separator has the function of serving as a barrier for separating fuel gas, oxidant gas and refrigerant from each other. In order to secure the passages of these gasses, as described above, a gas passage and a refrigerating passage are preferably provided on each of the separators. As the material for forming the separators, conventionally known materials, for example, carbon such as dense carbon graphite and carbon plate, or metals such as stainless steel can be properly adopted without any limitation. The thickness and size of the separators, and the shape and size of each passage to be provided are not particularly limited, and may be properly determined in consideration of the desired output performance of the obtained fuel cell.

The method for producing the fuel cell is not particularly limited, and a conventionally known knowledge in the field of the fuel cell can be properly referred to.

Moreover, in order that the fuel cell can generate a desired voltage, a fuel cell stack, which has a structure such as to connect in series a plurality of layers of membrane electrode assemblies through the separators, may be formed. The shape of the fuel cell is not particularly limited, and may be properly determined so as to obtain battery characteristics such as the desired voltage.

The above-mentioned PEFC and membrane electrode assembly use the catalyst layer excellent in power generation performance. Accordingly, the PEFC and the membrane electrode assembly are excellent in power generation performance.

The PEFC according to the present embodiment and the fuel cell stack using the same can be, for example, mounted on a motor vehicle as a drive power source.

EXAMPLES

The effect of the present invention will be described by using the following examples and comparison examples. However, the technical scope of the present invention should not be construed to be confined to the following examples.

Synthesis Example 1

A carrier A was prepared, according to the method described in WO 2009/75264. As to the carrier A obtained as above, average particle size (diameter), pore volumes of micropores and mesopores, mode diameters of micropores and mesopores and BET specific surface area were measured. As a result, the average particle size (diameter) was 100 nm; the pore volume of micropores was 1.06 cc/g; the pore volume of mesopores was 0.92 cc/g; the mode diameter of micropores was 0.65 nm; the mode diameter of mesopores was 1.2 nm; and the BET specific surface area was 1753 $m^2/g$. Also, the R' value of this carrier A was measured and found to be 0.63.

Platinum (Pt) with an average particle size of 3.5 nm was carried on this carrier A prepared as described above as a catalytic metal so that the carrying ratio was 30% by weight to obtain catalyst powder A. Namely, 46 g or the carrier A was immersed in 1000 g of a dinitrodiammine platinum nitric acid solution with a platinum concentration of 4.6% by weight (platinum content: 46 g) and the mixture was stirred, then 100 ml of 100% ethanol was added as a reducing agent. This solution was stirred and mixed at the boiling point for 7 hours, thus, platinum was carried on the carrier A. Then, the mixture was filtered and dried to obtain a catalyst powder with a carrying ratio of 30% by weight. Thereafter, the catalyst powder was retained in a hydrogen atmosphere at a temperature of 900° C. for 1 hour, to obtain a catalyst powder A with an average particle size (diameter) of 100 nm.

As to the catalyst powder A obtained as above, pore volumes of micropores and mesopores, mode diameters of micropores and mesopores and BET specific surface area of the catalyst (after carrying Pt) were measured. The result is shown in Table 1 below. Also, the R' value of this catalyst powder A was measured and found to be 0.63.

Synthesis Example 2

Acid treatment was performed by immersing Black pearls 2000 manufactured by Cabot Corporation in a 3.0 mol/L nitric acid aqueous solution at 80° C. for 2 hours, then filtering and drying, to prepare carrier B. As to the carrier B obtained as above, average particle size (diameter), pore volumes of micropores and mesopores, mode diameters of micropores and mesopores and BET specific surface area were measured. As a result, the average particle size (diameter) was 50 nm; the pore volume of micropores was 0.49 cc/g; the pore volume of mesopores was 0.49 cc/g; the mode diameter of micropores was 0.53 nm; the mode diameter of mesopores was 1.21 nm; and the BET specific surface area was 1236 $m^2/g$. Also, the R' value of this carrier B was measured and found to be 0.73.

Subsequently, the same procedure for carrying platinum was carried out as in Synthesis Example 1, except for using the carrier B in place of the carrier A in Synthesis Example 1, to obtain catalyst powder B with an average particle size (diameter) of 100 nm. As to the catalyst powder B obtained as above, pore volumes of micropores and mesopores, mode diameters of micropores and mesopores and BET specific surface area of the catalyst (after carrying Pt) were measured. The result is shown in Table 1 below. Also, the R' value of this catalyst powder B was measured and found to be 0.73.

Synthesis Example 3

A carrier C was prepared by heating the carbon material obtained according to the method described in WO 2009/75264 to 1800° C. at a temperature rising rate of 500° C./hour in an argon atmosphere, then retaining it for 5 minutes.

As to the carrier C obtained as above, average particle size (diameter), pore volumes of micropores and mesopores, mode diameters of micropores and mesopores and BET specific surface area were measured. As a result, the average particle size (diameter) was 100 nm; the pore volume of micropores was 0.73 cc/g; the pore volume of mesopores was 0.58 cc/g; the mode diameter of micropores was 0.65 nm; the mode diameter of mesopores was 1.2 nm; and the BET specific surface area was 1346 $m^2/g$. Also, the R' value of this carrier C was measured and found to be 0.35.

Subsequently, the same procedure for carrying platinum was carried out as in Synthesis Example 1, except for using the carrier C in place of the carrier A in Synthesis Example 1, to obtain catalyst powder C with an average particle size (diameter) of 100 nm. As to the catalyst powder C obtained as above, pore volumes of micropores and mesopores, mode diameters of micropores and mesopores and BET specific surface area of the catalyst (after carrying Pt) were measured. The result is shown in Table 1 below. Also, the R' value of this catalyst powder C was measured and found to be 0.35.

Synthesis Example 4

A carrier (Black pearls 2000 manufactured by Cabot Corporation) in which the average particle size (diameter) was 50 nm; the pore volume of micropores was 0.49 cc/g; the pore volume of mesopores was 0.49 cc/g; the mode diameter of micropores was 0.47 nm; the mode diameter of mesopores was 1.21 nm; and the BET specific surface area was 1444 m/g was prepared, and was used as carrier D. Also, the R' value of this carrier D was measured and found to be 0.85.

Subsequently, the same procedure for carrying platinum was carried out as in Synthesis Example 1, except for using the carrier D in place of the carrier A in Synthesis Example 1, to obtain catalyst powder D with an average particle size (diameter) of 50 nm. As to the catalyst powder D obtained as above, pore volumes of micropores and mesopores, mode diameters of micropores and mesopores and BET specific surface area of the catalyst (after carrying Pt) were measured. The result is shown in Table 1 below. Also, the R' value of this catalyst powder D was measured and found to be 0.85.

TABLE 1

| | Carrier (Before carrying Pt) | | | | Catalyst (After carrying Pt) | | | | | | | BET specific surface area ($m^2/g^{*2}$) |
|---|---|---|---|---|---|---|---|---|---|---|---|---|
| | Micropores | | Mesopores | | Micropores | | | Mesopores | | | | |
| | Pore volume (cc/g*1) | Mode diameter (nm) | Pore volume (cc/g*1) | Mode diameter (nm) | Pore volume (cc/g*1) | Mode diameter (nm) | Decrease of pore volume (cc/g*1) | Pore volume (cc/g*1) | Mode diameter (nm) | Decrease of pore volume (cc/g*1) | R' value | |
| Synthesis Example 1 (Example 1) | 1.06 | 0.65 | 0.92 | 1.2 | 1.03 | 0.65 | 0.03 | 0.63 | 1.2 | 0.29 | 0.63 | 1770 |
| Synthesis Example 2 (Example 2) | 0.49 | 0.47 | 0.49 | 1.21 | 0.48 | 0.53 | 0.01 | 0.4 | 1.22 | 0.09 | 0.73 | 1236 |
| Synthesis Example 3 (Comparative Example 1) | 0.73 | 0.65 | 0.58 | 1.2 | 0.69 | 0.75 | 0.04 | 0.45 | 0.93 | 0.13 | 0.35 | 1226 |

TABLE 1-continued

| | Carrier (Before carrying Pt) | | | | Catalyst (After carrying Pt) | | | | | | | BET specific surface area $(m^2/g^{*2})$ |
|---|---|---|---|---|---|---|---|---|---|---|---|---|
| | Micropores | | Mesopores | | Micropores | | | Mesopores | | | | |
| | Pore volume $(cc/g^{*1})$ | Mode diameter (nm) | Pore volume $(cc/g^{*1})$ | Mode diameter (nm) | Pore volume $(cc/g^{*1})$ | Mode diameter (nm) | Decrease of pore volume $(cc/g^{*1})$ | Pore volume $(cc/g^{*1})$ | Mode diameter (nm) | Decrease of pore volume $(cc/g^{*1})$ | R' value | |
| Synthesis Example 4 (Comparative Example 2) | 0.49 | 0.47 | 0.49 | 1.21 | 0.27 | 0.57 | 0.22 | 0.23 | 1.22 | 0.26 | 0.85 | 1291 |

*[1] The unit of pore volume is cc/g carrier.
*[2] The unit of BET specific surface area is $m^2/g$ carrier.

It can be seen from Table 1 that the pore volumes of both mesopores and micropores are decreased, and the decrease of the pore volume of mesopores is larger in the catalyst powders A to D. Based on such result, it is considered that the catalytic metal is selectively carried inside the pores of the mesopores in the catalyst powders A to D. Here, in Table 1, the pore volume of micropores also slightly decreases in the catalyst powders A to D, and it is presumed to be because the catalytic metal blocks the entrance of micropores.

Example 1

The catalyst powder A prepared in Synthesis Example 1 and an ionomer dispersion liquid (Nafion (registered trademark) D2020, EW=1100 g/mol, manufactured by DuPont) as a polymer electrolyte were mixed so that the weight ratio of the carbon carrier to the ionomer was 0.9 (mixture 1). Separately, a mixed solvent 1 with a mixing weight ratio of water and n-propyl alcohol (NPA) of 60/40 was prepared. This mixed solvent 1 was added to the mixture 1 so that the solid content ratio (Pt+carbon carrier+ionomer) was 7% by weight to prepare a cathode catalyst ink.

Platinum (Pt) with an average particle size of 2.5 nm as a catalytic metal was carried in Ketjen black (particle size: 30 to 60 nm) as a carrier so that the carrying ratio was 50% by weight to obtain a catalyst powder. This catalyst powder and an ionomer dispersion liquid (Nafion (registered trademark) D2020, EW=1100 g/mol, manufactured by DuPont) as a polymer electrolyte were mixed so that the weight ratio of the carbon carrier to the ionomer was 0.9 (mixture 2). Separately, a mixed solvent 2 with a mixing weight ratio of water and n-propyl alcohol of 50/50 was prepared. This mixed solvent 2 was added to the mixture 2 so that the solid content ratio (Pt+carbon carrier+ionomer) was 7% by weight to prepare an anode catalyst ink.

Next, a gasket (manufactured by Teijin Dupont Films Japan Limited, Teonex, film thickness: 25 μm (adhesive layer: 10 μm)) was provided around the both sides of a polymer electrolyte membrane (manufactured by Dupont, NAFION NR211, film thickness: 25 μm). Subsequently, the exposed part of one side of the polymer electrolyte membrane was coated with the cathode catalyst ink in a size of 5 cm×2 cm by spray coating method. The catalyst ink was dried by keeping the stage of spray coating at 60° C. for 1 minute to obtain a cathode catalyst layer. The platinum carrying amount at this time was 0.15 mg/cm². Then, spray coating on the electrolyte membrane and heat treatment were performed as in the cathode catalyst layer to form an anode catalyst layer.

Both sides of the resulting laminated body were sandwiched between gas diffusion layers (24BC, manufactured by SGL Carbon) to obtain a membrane electrode assembly (1) (MEA (1)).

Example 2

The same procedure was carried out as in Example 1, except for using the catalyst powder B obtained in Synthesis Example 2, in place of the catalyst powder A in Example 1, to prepare a membrane electrode assembly (2) (MEA (2)).

Comparative Example 1

The same procedure was carried out as in Example 1, except for using the catalyst powder C obtained in Synthesis Example 3, in place of the catalyst powder A in Example 1, to prepare a comparative membrane electrode assembly (1) (comparative MEA (1)).

Comparative Example 2

The same procedure was carried out as in Example 1, except for using the catalyst powder D obtained in Synthesis Example 4, in place of the catalyst powder A in Example 1, to prepare a comparative membrane electrode assembly (2) (comparative MEA (2)).

Experiment 1: Evaluation of Voltage Drop Caused by Oxygen Transportation

The membrane electrode assemblies (1) to (2) prepared in Examples 1 to 2 respectively and the comparative electrode assemblies (1) to (2) prepared in Comparative Examples 1 to 2 respectively as described above were evaluated under the following condition. Namely, the difference in voltage ΔV (V) of $H_2$ (anode)/$O_2$ (cathode) and $H_2$ (anode)/Air (cathode) at 80° C., 200 kPa, 100% RH, and 1.5 A/cm² was evaluated. The results are shown in Table 2 below.

TABLE 2

| | R' value | Voltage drop ΔV (V) |
|---|---|---|
| Example 1 | 0.63 | 0.087 |
| Example 2 | 0.73 | 0.101 |
| Comparative Example 1 | 0.35 | 0.119 |
| Comparative Example 2 | 0.85 | 0.152 |

Based on the results of Table 2, it was shown that the voltage drop (ΔV) of MEAs (1) to (2) of the examples is small, as compared with that of comparative MEAs (1) to (2)

of the comparative examples. The smaller the value of voltage drop (ΔV), the more excellent the oxygen transportability, thus it was revealed that the catalyst layer for fuel cell of the present invention is excellent in gas transportability, as compared with the electrode catalyst layer containing a catalyst not having the R' value specified in the present invention.

The present application is based on Japanese Patent Application No. 2014-220569 filed on Oct. 29, 2014, the disclosure of which is hereby incorporated by reference in its entirety.

DESCRIPTION OF THE REFERENCES

1 Polymer electrolyte fuel cell (PEFC)
2 Solid polyelectrolyte membrane
3 Catalyst layer
3a Anode catalyst layer
3c Cathode catalyst layer
4a Anode gas diffusion layer
4c Cathode gas diffusion layer
5 Separator
5a Anode separator
5c Cathode separator
6a Anode gas passage
6c Cathode gas passage
7 Refrigerant passage
10 Membrane electrode assembly (MEA)
20, 20' Catalyst
22, 22' Catalytic metal
23, 23' Carrier
24, 24' Mesopores
25 Micropores

The invention claimed is:

1. An electrode catalyst for fuel cell comprising a catalyst carrier containing carbon as a main component and a catalytic metal carried on the catalyst carrier,
   wherein the catalyst has a ratio R' (D'/G intensity ratio) of a peak intensity of D' band (D' intensity) measured in the vicinity of 1620 $cm^{-1}$ to a peak intensity of G band (G intensity) measured in the vicinity of 1580 $cm^{-1}$ by Raman spectroscopy of more than 0.6 and 0.8 or less, and satisfies at least one of the following (a) to (d):
   (a) the catalyst has pores with a radius of less than 1 nm and pores with a radius of 1 nm or more, a pore volume of the pores with a radius of less than 1 nm of 0.3 cc/g carrier or more, and the catalytic metal carried inside the pores with a radius of 1 nm or more;
   (b) the catalyst has pores with a radius of 1 nm or more and less than 5 nm, a pore volume of the pores of 0.8 cc/g carrier or more, a specific surface area of the catalytic metal of 60 $m^2$/g carrier or less and the catalytic metal carried inside the pores with a radius of 1 nm or more;
   (c) the catalyst has pores with a radius of less than 1 nm and pores with a radius of 1 nm or more, a mode radius of pore distribution of the pores with a radius of less than 1 nm is 0.3 nm or more and less than 1 nm, and the catalytic metal is carried inside the pores with a radius of 1 nm or more; and
   (d) a mode radius of pore distribution of pores with a radius of 1 nm or more is 1 nm or more and less than 5 nm, the catalytic metal is carried inside the pores with a radius of 1 nm or more, the mode radius is half or less of an average particle size of the catalytic metal, and a pore volume of the pores with a radius of 1 nm or more is 0.4 cc/g carrier or more.

2. The electrode catalyst for fuel cell according to claim 1, wherein the catalytic metal is platinum or comprises platinum and a metal component other than platinum.

3. An electrode catalyst layer for fuel cell comprising the electrode catalyst for fuel cell set forth in claim 1 and an electrolyte.

4. The electrode catalyst layer for fuel cell according to claim 3, wherein the electrolyte is a fluorine-based polymer electrolyte.

5. A method for producing the electrode catalyst layer for fuel cell set forth in claim 3, comprising preparing a coating liquid containing a catalyst containing a catalyst carrier having carbon as a main component and a platinum-containing catalytic metal carried on the catalyst carrier, an electrolyte, and a water-alcohol mixed solvent with a mixing weight ratio of water and alcohol of 55/45 to 95/5, and applying the coating liquid to form an electrode catalyst layer.

6. A membrane electrode assembly for fuel cell comprising the electrode catalyst for fuel cell set forth in claim 1.

7. A fuel cell comprising the membrane electrode assembly for fuel cell set forth in claim 6.

* * * * *